United States Patent
Ebrahimi Tazeh Mahalleh et al.

(10) Patent No.: US 8,325,685 B2
(45) Date of Patent: Dec. 4, 2012

(54) SYSTEM AND METHOD FOR IMPROVED CONTROL CHANNEL TRANSMIT DIVERSITY

(75) Inventors: Masoud Ebrahimi Tazeh Mahalleh, Ottawa (CA); Robert Mark Harrison, Irving, TX (US); Yongkang Jia, Ottawa (CA); Hua Xu, Kanata (CA)

(73) Assignee: Research In Motion Limited, Waterloo, Ontario (CA)

( * ) Notice: Subject to any disclaimer, the term of this patent is extended or adjusted under 35 U.S.C. 154(b) by 260 days.

(21) Appl. No.: 12/705,459

(22) Filed: Feb. 12, 2010

(65) Prior Publication Data

US 2011/0200018 A1    Aug. 18, 2011

(51) Int. Cl.
 *H04J 3/00*    (2006.01)
(52) U.S. Cl. .......................... 370/336; 370/329; 455/509
(58) Field of Classification Search .................. 370/329, 370/330, 336, 342; 455/509; 375/267, 295
 See application file for complete search history.

(56) References Cited

U.S. PATENT DOCUMENTS

| | | | |
|---|---|---|---|
| 2008/0101310 A1* | 5/2008 | Marzetta | 370/342 |
| 2008/0318608 A1* | 12/2008 | Inoue et al. | 455/509 |
| 2009/0034505 A1 | 2/2009 | Papasakellariou et al. | |
| 2009/0046645 A1* | 2/2009 | Bertrand et al. | 370/329 |
| 2010/0002800 A1 | 1/2010 | Kim et al. | |
| 2010/0027450 A1 | 2/2010 | Montojo et al. | |
| 2010/0034174 A1 | 2/2010 | Nishikawa et al. | |
| 2010/0034312 A1* | 2/2010 | Muharemovic et al. | 375/267 |
| 2010/0182975 A1* | 7/2010 | Malladi et al. | 370/330 |

OTHER PUBLICATIONS

International Search Report and Written Opinion for PCT Application No. PCT/US2011/024506, mailed Apr. 6, 2011.

\* cited by examiner

*Primary Examiner* — Albert T Chou
(74) *Attorney, Agent, or Firm* — Conley Rose, P.C.; J. Robert Brown, Jr.

(57) ABSTRACT

A method for providing transmit diversity in wireless network communications is presented. An indication of a slot structure is received. The slot structure identifies at least a first location of a reference signal within a slot. A first reference signal is transmitted within a first slot using a first antenna. A location of the first reference signal within the first slot is determined by the slot structure. A second reference signal is transmitted within the first slot using a second antenna. A location of the second reference signal within the first slot is determined by the slot structure. In some cases, the slot structure identifies a second location of a reference signal within the slot structure. The second location being offset from the first location, and a third reference signal is transmitted within the first slot at the second location on the first antenna.

13 Claims, 11 Drawing Sheets

SYSTEM AND METHOD FOR IMPROVED CONTROL CHANNEL TRANSMIT DIVERSITY

BACKGROUND

The present invention relates generally to data transmission in mobile communication systems and more specifically to a user equipment (UE) specific slot structure for Physical Uplink Control CHannel (PUCCH) with transmit diversity to improve multiplexing capability.

As used herein, the terms "user equipment" and "UE" can refer to wireless devices such as mobile telephones, personal digital assistants (PDAs), handheld or laptop computers, and similar devices or other User Agents ("UAs") that have telecommunications capabilities. A UE may refer to a mobile, or wireless device. The term "UE" may also refer to devices that have similar capabilities but that are not generally transportable, such as desktop computers, set-top boxes, or network nodes.

In traditional wireless telecommunications systems, transmission equipment in a base station transmits signals throughout a geographical region known as a cell. As technology has evolved, more advanced equipment has been introduced that can provide services that were not possible previously. This advanced equipment might include, for example, an evolved universal terrestrial radio access network (E-UTRAN) node B (eNB) rather than a base station or other systems and devices that are more highly evolved than the equivalent equipment in a traditional wireless telecommunications system. Such advanced or next generation equipment may be referred to herein as long-term evolution (LTE) equipment, and a packet-based network that uses such equipment can be referred to as an evolved packet system (EPS). Additional improvements to LTE systems/equipment will eventually result in an LTE advanced (LTE-A) system. As used herein, the phrase "base station" or "access device" will refer to any component, such as a traditional base station or an LTE or LTE-A base station (including eNBs), that can provide a UE with access to other components in a telecommunications system.

In mobile communication systems such as E-UTRAN, a base station provides radio access to one or more UEs. The base station comprises a packet scheduler for dynamically scheduling downlink traffic data packet transmissions and allocating uplink traffic data packet transmission resources among all the UEs communicating with the base station. The functions of the scheduler include, among others, dividing the available air interface capacity between UEs, deciding the transport channel to be used for each UE's packet data transmissions, and monitoring packet allocation and system load. The scheduler dynamically allocates resources for Physical Downlink Shared CHannel (PDSCH) and Physical Uplink Shared CHannel (PUSCH) data transmissions, and sends scheduling information to the UEs through a scheduling channel. In some cases, such as when no uplink application layer data is to be transmitted by the UE, control information is communicated from the UE to the base station using the PUCCH.

In LTE systems, data is transmitted to and from base stations and UEs on allocated Resource Blocks (RBs). In the LTE uplink, an RB, such as an RB used for PUCCH transmission, may be defined as a set of multiple consecutive subcarriers in the frequency domain and one or more consecutive symbols in the time domain. FIG. 1a is an illustration of several example PUCCH resource blocks (RBs). Generally, PUCCH RBs are located at or near the two extremes of available system bandwidth. Accordingly, referring to FIG. 1a, RBs 100 include two PUCCH RBs 102 that are allocated at the beginning of system bandwidth and two PUCCH RBs 102 that are allocated at the end of the available system bandwidth. The PUCCH for a single UE is transmitted over a single RB 102 at each of the two available slots 104 within the subframe. Note that here each PUCCH RB occupies all of one slot. Generally, for a UE, the assigned PUCCH RBs in the two slots of a subframe are allocated at opposite sides of the bandwidth. Accordingly, if a UE is assigned a first RB having index 1 (one greater than the lowest index of 0) in the first slot, the UE is also assigned the RB at index N−2 in the second slot. Accordingly, referring to FIG. 1a, a UE may be assigned RB 106 in addition to RB 108.

FIG. 1b is an illustration showing additional detail of the PUCCH RBs of FIG. 1a. RBs 100 each include several symbols formed in each of the two available slots. Each slot includes several symbols 110 that may each contain either data or a reference signal (RS). The RS may be used to measure channel conditions between the UE and a base station. In the present disclosure, the PUCCH RB structure is summarized as a plurality of individual slots.

In LTE-A, a UE may be configured to initiate simultaneous transmission from multiple antennas for uplink (UL) communications. When using multiple antennas, the communications may be referred to as multiple-input, multiple-output (MIMO) communications. By using MIMO, the signal strength and throughput between a UE and a base station can be improved. When using MIMO, a suitable transmit diversity (TxD) scheme can be used to ensure that communications transmitted by each antenna can be distinguished from one another. For example, the transmissions of each antenna may be encoded using different orthogonal sequences to make them more easily separable. Accordingly, the TxD scheme can be used to improve the coverage in an LTE-A system, to reduce required UE transmission power to reach a given level of coverage, and/or to reduce the interference caused by the transmissions.

In MIMO configurations, with respect to the PUCCH, although some TxD schemes provide improved performance when compared to single antenna transmissions, they suffer drawbacks in that each UE requires twice as many of the limited number of available orthogonal resources to enable the base station to receive and separate transmissions from each antenna accurately. As a result, the number of UEs that can be multiplexed for their PUCCH transmission within the same RB (that is, transmit on the same RB without causing excessive interference), is reduced by a factor of two when using two antennas as compared with transmissions using a single antenna.

Generally, in existing LTE uplink communications, the multiple-access method for the PUCCH is code division multiple access (CDMA). Using CDMA, several UEs transmit their PUCCHs using the same time-frequency resource blocks, but the transmissions are separated using UE-specific orthogonal sequence (OS) resources. The PUCCH can be configured in several different possible formats (some existing PUCCH configurations may have 6 different configurations). In one example PUCCH format designated format 2, the orthogonal resources are generated by applying cyclic shifting to a base sequence of length 12 with different cyclic shifts. As such, the orthogonal resources may be referred to as cyclic shift (CS) sequences or OS sequences. Accordingly, the number of these mutually orthogonal resources may be equal to 12.

For alternative PUCCH formats such as format 2, format 2a, and format 2b with normal cyclic prefixes (CP), of the seven symbols forming a transmission slot (see, for example, the RB of FIG. 1b), five symbols are used for data symbol (DS) transmission (see element 112 for example) and two symbols are used for reference symbol (RS) transmission (see element 114, for example). The RS may be used to measure and evaluate the quality of the radio link between the UE and the base station. In the case of extended CP, each slot contains five DSs and one RS.

FIGS. 2a and 2b are illustrations of example slot structures for format 2 PUCCHs. FIG. 2a is an illustration of the slot structure including a normal CP and FIG. 2b is an illustration of the slot structure including an extended CP. In each slot structure, the position of the DSs and RSs may be fixed as specified by a standard. The resource elements (e.g., subcarriers) at each DS or RS are filled using an appropriate CS sequence. For each DS, the corresponding CS sequence is multiplied by one of the symbols generated from the encoded data to be transmitted. The assignment of CS sequence to the symbols in each subframe may be configured by the base station and can be signaled to the UE using higher layer signaling. In any given RB of the PUCCH and at any time, each CS sequence can be used by at most one UE. Accordingly, in the existing configurations of LTE, the multiplexing capacity of PUCCH is limited to 12 UEs (using a single antenna) when 12 CS OSs are provided, meaning that a maximum of 12 UEs could multiplex and transmit their PUCCH on the same PUCCH RBs.

There are several schemes for providing TxD in PUCCH communications. Transparent schemes are those that use a single orthogonal sequence for the DSs of a PUCCH slot. In those schemes, the power resources of both transmit antennas are utilized while making the scheme transparent to the base station. Examples of this type of scheme include RF combining and slot-based precoding vector switching (PVS) as described in R1-090786, LG Electronics, "PUCCH TxD Schemes for LTE-A", 3GPP TSG RAN WG1 #56, February 2009 and R1-091374, Nortel, "Evaluation of transmit diversity for PUCCH in LTE-A", 3GPP TSG RAN WG1 #56b, March 2009. In these schemes, both transmit antennas use the same CS OS sequence. As a result, there is no need to signal a new sequence assignment to the UE and also the multiplexing capacity remains the same as in LTE Release 8 (Rel-8). However, while these schemes provide power pooling benefits, they provide little or no spatial diversity gain over single antenna transmission implementations.

In contrast, non-transparent schemes using a single OS for the DS, but different OSs for the RS may be implemented. Examples of this scheme include Space Time Block Code (STBC) based TxD schemes described in R1-090786, LG Electronics, "PUCCH TxD Schemes for LTE-A", 3GPP TSG RAN WG1 #56, February 2009, R1-091374, Nortel, "Evaluation of transmit diversity for PUCCH in LTE-A", 3GPP TSG RAN WG1 #56b, March 2009, and R1-094223, Qualcomm Europe, "Transmit Diversity for PUCCH Format 2/2a/2b", 3GPP TSG RAN WG1 #58b, October 2009. In these schemes, both transmit antennas are configured to use the same orthogonal sequence for transmission of DSs. However, RS transmissions using different antennas use different OSs to allow for base station channel estimation to be performed for each antenna individually. In that case, because two OSs are needed for the two RSs transmitted by the two antennas, the multiplexing capacity of these schemes is reduced by a factor of two as compared with the single antenna transmission in Rel-8.

Alternatively, non-transparent schemes using two orthogonal sequences for both the DS and RS may be implemented. In these schemes, different transmit antennas use different orthogonal sequences for transmission of both DSs and RSs. Example of such schemes include Spatial Orthogonal-Resource Transmit Diversity (SORTD) in which the same modulated symbols are transmitted simultaneously from different antennas using different CS sequences. Example schemes are described in R1-090786, LG Electronics, "PUCCH TxD Schemes for LTE-A", 3GPP TSG RAN WG1 #56, February 2009, R1-091374, Nortel, "Evaluation of transmit diversity for PUCCH in LTE-A", 3GPP TSG RAN WG1 #56b, March 2009, R1-094223, Qualcomm Europe, "Transmit Diversity for PUCCH Format 2/2a/2b", 3GPP TSG RAN WG1 #58b, October 2009, and R1-093052, Huawei, "Performance of UL multiple antenna transmission for PUCCH", 3GPP TSG RAN WG1 #58, August 2009. The advantage of these schemes is that their performance is better than schemes that use the same OS on each antenna. However, as a result of using twice as many of the available orthogonal resources, the schemes' PUCCH multiplexing capacity is reduced by a factor of two as compared with the PUCCH multiplexing capacity of single antenna transmission in Rel-8.

Accordingly, in PUCCH transmissions using multiple antennas, there is a need for a TxD scheme that preserves the low peak-to-average power ratio (PAPR) property of the UL signal, makes efficient use of the power resources of both transmit antennas available to a UE, provides high PUCCH multiplexing capability, provides improved performance over single antenna transmissions and is backward compatible with existing network implementations (e.g., LTE Release 8).

BRIEF DESCRIPTION OF THE DRAWINGS

For a more complete understanding of this disclosure, reference is now made to the following brief description, taken in connection with the accompanying drawings and detailed description, wherein like reference numerals represent like parts.

FIG. 1b is an illustration showing additional detail of the PUCCH RBs of FIG. 1a;

FIG. 5 is an illustration of transmission slots implemented using a UE-specific relative delay;

FIG. 6 is an illustration of transmission slots implemented using a UE-specific relative delay for an extended CP case;

FIG. 7 is an illustration of a UE-specific slot offset for STBC+SORTD with normal CP;

DETAILED DESCRIPTION

Figure 1A:
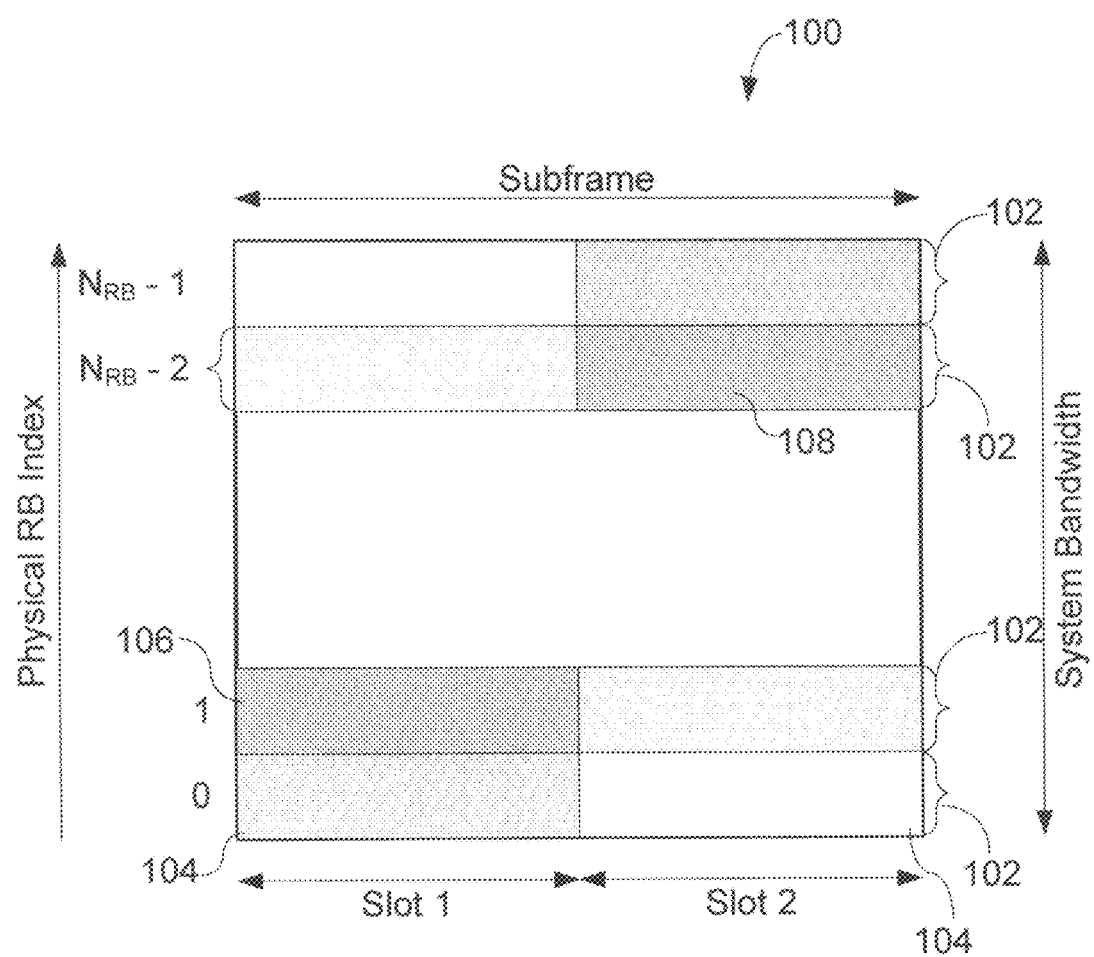
FIG. 1a is an illustration of example Physical Uplink Control CHannel (PUCCH) resource block (RB) locations.
Figure 1B:
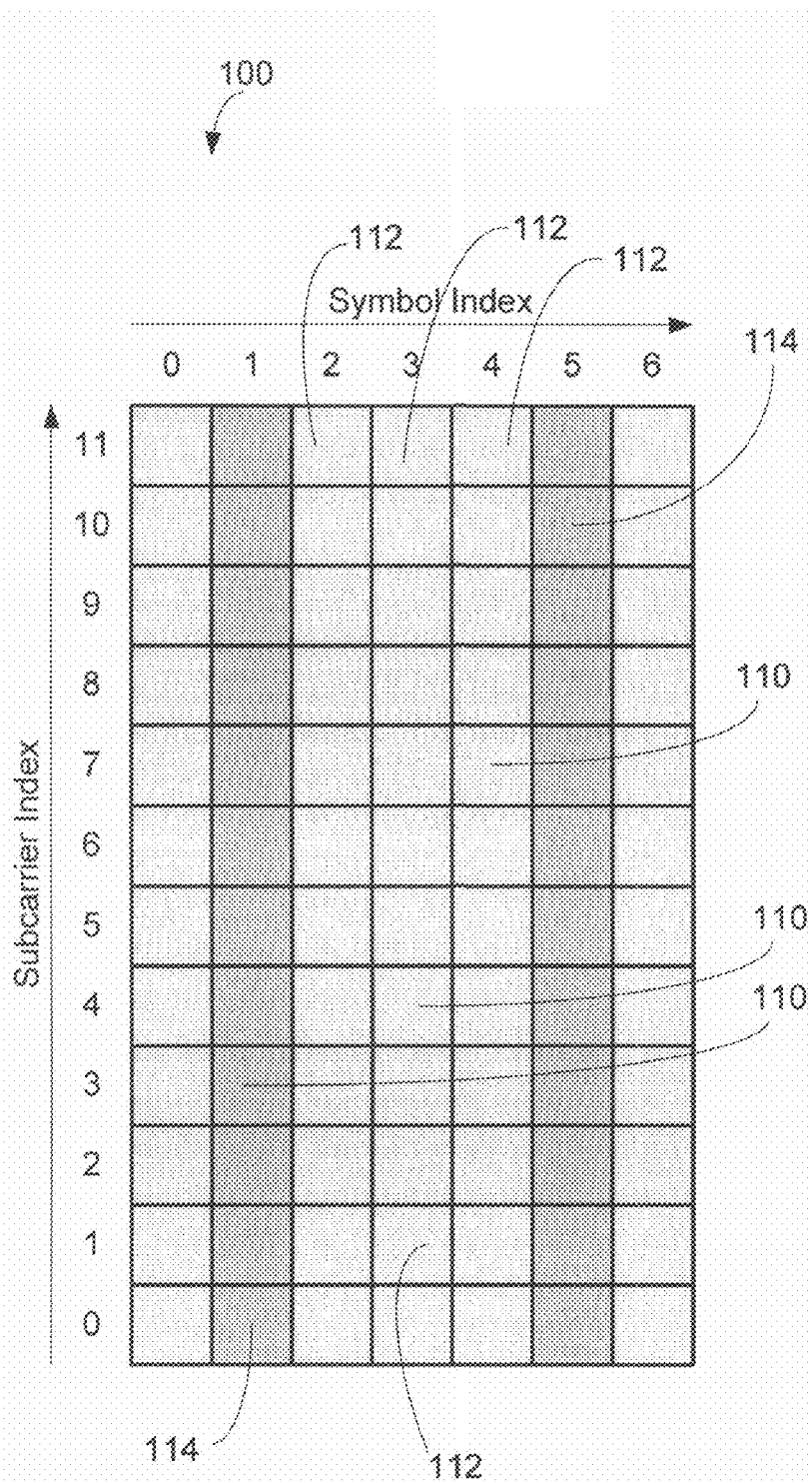

The present invention relates generally to data transmission in mobile communication systems and more specifically to a user equipment (UE) specific slot structure for Physical Uplink Control CHannel (PUCCH) with transmit diversity to improve multiplexing capability.

Some implementations include a method for providing transmit diversity in wireless network communications. The method includes receiving an indication of a slot structure. The slot structure identifies at least a first location of a reference signal within a slot. The method includes transmitting a first reference signal within a first slot using a first antenna. A location of the first reference signal within the first slot is determined by the slot structure. The method includes transmitting a second reference signal within the first slot using a second antenna. A location of the second reference signal within the first slot is determined by the slot structure.

Other implementations include a method for providing transmit diversity in wireless network communications. The method includes receiving an indication of a slot structure. The slot structure identifies at least a location of a first reference signal and a location of a second reference signal. The method includes transmitting a first and a second symbol within a first slot using a first antenna and a first orthogonal resource. The second symbol is transmitted after the first symbol. The method includes transforming the first and second symbols to form a first transformed symbol and a second transformed symbol, and transmitting the transformed first symbol and the transformed second symbol within the first slot using a second antenna and the first orthogonal resource. The first transformed symbol is transmitted after the second transformed symbol. The method includes transmitting a first reference signal within the first slot at a location determined by the slot structure. The first reference signal is transmitted using a first antenna. The method includes transmitting a second reference signal within the first slot at a second location determined by the slot structure. The second reference signal is transmitted using a second antenna.

Other implementations include a method for providing transmit diversity in wireless network communications. The method includes receiving an indication of a slot structure. The slot structure identifies at least one location of a reference signal within a slot and identifies a first and second orthogonal code. The method includes encoding one or more reference signals using the first orthogonal code and the second orthogonal code identified by the slot structure, and transmitting the encoded one or more reference signal within a first slot. A location of the encoded one or more reference signal is determined by the slot structure.

Other implementations include a method for providing transmit diversity in wireless network communications. The method includes receiving an indication of a Physical Uplink Control Channel (PUCCH) timing advance, transmitting a first reference signal of a PUCCH at a delay relative to downlink frame timing at least partially determined by the PUCCH timing advance, and transmitting a second reference signal of a PUCCH at a delay relative to downlink frame timing at least partially determined by the PUCCH timing advance. The method includes transmitting a reference signal in a Physical Uplink Shared Channel (PUSCH) at a delay relative to downlink frame timing at least partially determined by a different timing advance than the PUCCH timing advance.

Other implementations include a base station comprising a processor configured to transmit an indication of a slot structure. The slot structure identifies at least a first location of a reference signal within a slot. The processor is configured to receive a first reference signal within a first slot. A location of the first reference signal within the first slot is determined by the slot structure. The processor is configured to receive a second reference signal within the first slot. A location of the second reference signal within the first slot is determined by the slot structure.

Other implementations include a base station comprising a processor configured to transmit an indication of a slot structure. The slot structure identifies at least one location of a reference signal within a slot and identifies a first and second orthogonal code. The processor is configured to receive one or more encoded reference signals within a first slot. A location of the one or more encoded reference signal is determined by the slot structure. The one or more encoded reference signals are encoded using the first orthogonal code and the second orthogonal code identified by the slot structure.

Other implementations include a user equipment (UE) comprising a processor configured to receive an indication of a slot structure. The slot structure identifies at least a first location of a reference signal within a slot. The processor is configured to transmit a first reference signal within a first slot using a first antenna. A location of the first reference signal within the first slot is determined by the slot structure. The processor is configured to transmit a second reference signal within the first slot using a second antenna. A location of the second reference signal within the first slot is determined by the slot structure.

To the accomplishment of the foregoing and related ends, the invention, then, comprises the features hereinafter fully described. The following description and the annexed drawings set forth in detail certain illustrative aspects of the invention. However, these aspects are indicative of but a few of the various ways in which the principles of the invention can be employed. Other aspects, advantages and novel features of the invention will become apparent from the following detailed description of the invention when considered in conjunction with the drawings.

The various aspects of the subject invention are now described with reference to the annexed drawings, wherein like numerals refer to like or corresponding elements throughout. It should be understood, however, that the drawings and detailed description relating thereto are not intended to limit the claimed subject matter to the particular form disclosed. Rather, the intention is to cover all modifications, equivalents, and alternatives falling within the spirit and scope of the claimed subject matter.

As used herein, the terms "component," "system" and the like are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a computer and the computer can be a component. One or more components may reside within a process and/or thread of execution and a component may be localized on one computer and/or distributed between two or more computers.

The word "exemplary" is used herein to mean serving as an example, instance, or illustration. Any aspect or design described herein as "exemplary" is not necessarily to be construed as preferred or advantageous over other aspects or designs.

Furthermore, the disclosed subject matter may be implemented as a system, method, apparatus, or article of manufacture using standard programming and/or engineering techniques to produce software, firmware, hardware, or any combination thereof to control a computer or processor based device to implement aspects detailed herein. The term "article of manufacture" (or alternatively, "computer program product") as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the claimed subject matter.

In MIMO network configurations, multiple antennas may be used to transmit PUCCH communications from a UE to a base station. When using multiple antennas, a suitable transmit diversity (TxD) scheme may be implemented to improve the coverage in an LTE-A system. Such a TxD scheme requires that the communications transmitted by each of the available antennas be distinguishable from one another. In some cases, TxD schemes for PUCCH may be configured to use orthogonal resources to assist in distinguishing between the transmissions of each antenna. However, because existing TxD schemes allocate unique orthogonal resources for each antenna, the existing schemes use excessive amounts of the available orthogonal resources limiting the number of UEs that can be serviced using the same PUCCH RB in a MIMO system. Alternatively, if the same orthogonal resources are used for each antenna, the existing schemes make it difficult to separate PUCCH transmissions from each antenna.

Generally, existing TxD schemes suffer from two problems. The first problem is overuse of the limited number of available orthogonal resources. As discussed above, for non-transparent schemes, a base station needs to estimate the channel coefficients of each of the two transmit antennas. Accordingly, different orthogonal sequences should be used for transmission of RSs from the two transmit antennas. For example, in Rel-8 because the total number of orthogonal sequences is limited to 12, the PUCCH multiplexing capacity may be reduced to 6 for two antenna TxD as two orthogonal sequences are needed for each UE, one for each antenna.

Figure 3:
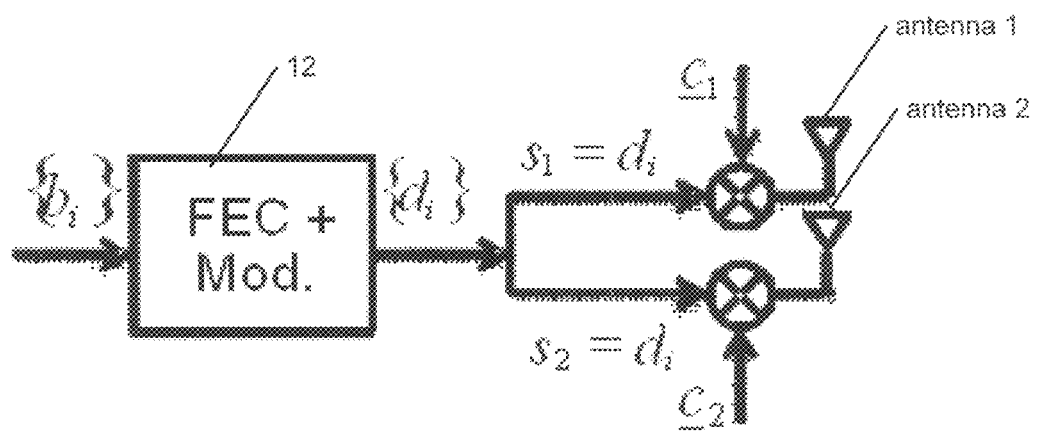
FIG. 3 is a block diagram of Spatial Orthogonal-Resource Transmit Diversity (SORTD) illustrating how incoming information is processed and transmitted using two antennas in a multiple-input multiple-output (MIMO) configuration.

As an example of this problem, the Spatial Orthogonal-Resource Transmit Diversity (SORTD) TxD scheme is illustrated in FIG. 3. FIG. 3 is a block diagram of SORTD illustrating how incoming information is processed and transmitted using two antennas in a MIMO configuration. Referring to FIG. 3, information bits $b_i$ enter the FEC/Modulator block 12 to generate 10 quadrature phase-shift keying (QPSK) modulated symbols $d_i$. The same symbols $\{d\}$ are used to generate symbols $\{s_i\}$ such that $s_1=s_2=d_i$. Each modulated symbol $s_i$ is mapped to antenna i.

The symbol $s_i$ over antenna i where i may be equal to 1 or 2 is multiplied by the orthogonal CS sequence $c_i$, where c1 is not the same as c2. The resultant value is then mapped to the corresponding DS in the assigned RB and is transmitted on the antenna corresponding to the symbol. In this scheme, the RSs are also transmitted using different CS sequences for different antennas.

As shown in FIG. 3, in any given RB and at any time, each UE uses two OSs, one for each antenna. The assignment of CS OS to UEs can be made in various ways. One example of the assignment is shown below in Table 1.

In Table 1, as in the case of the remaining tables in the present disclosure, rows correspond to UEs that can be multiplexed in the same time-frequency resource, and columns correspond to symbol times, where $S_i$ denotes the $i^{th}$ symbol in the transmission slot. The underlined and non-underlined values illustrate the locations of RSs and DSs, respectively, within each slot. As seen in Table 1, the numbers within the table are the index of the OS (namely, the index of cyclic shift sequences) ranging from 1 to 12. These are logical indices of OS. In practice, as in Rel. 8, these indices can be mapped to actual indices based on the symbol number. Generally, however, the numbers used within each table are used to represent different orthogonal codes that may be used when transmitting each symbol. The index below $S_i$ in each row of the table shows the orthogonal sequences are used by the corresponding UE at the $i^{th}$ symbol. Accordingly, for symbol $S_1$, UE#1 uses CS sequences CS-1 and CS-7 for transmitting via each antenna. For the same symbol $S_1$, UE#2 uses CS sequences CS-2 and CS-8 for transmitting via each antenna. As shown in Table 1, when using SORTD, at most 6 UEs, each with two antennas, can be multiplexed within the same RB.

TABLE 1

| UE | $S_1$ | $S_2$ | $S_3$ | $S_4$ | $S_5$ | $S_6$ | $S_7$ |
|---|---|---|---|---|---|---|---|
| 1 | 1, 7 | <u>1, 7</u> | 1, 7 | 1, 7 | 1, 7 | <u>1, 7</u> | 1, 7 |
| 2 | 2, 8 | <u>2, 8</u> | 2, 8 | 2, 8 | 2, 8 | <u>2, 8</u> | 2, 8 |
| 3 | 3, 9 | <u>3, 9</u> | 3, 9 | 3, 9 | 3, 9 | <u>3, 9</u> | 3, 9 |
| 4 | 4, 10 | <u>4, 10</u> | 4, 10 | 4, 10 | 4, 10 | <u>4, 10</u> | 4, 10 |
| 5 | 5, 11 | <u>5, 11</u> | 5, 11 | 5, 11 | 5, 11 | <u>5, 11</u> | 5, 11 |
| 6 | 6, 12 | <u>6, 12</u> | 6, 12 | 6, 12 | 6, 12 | <u>6, 12</u> | 6, 12 |

Figure 4:
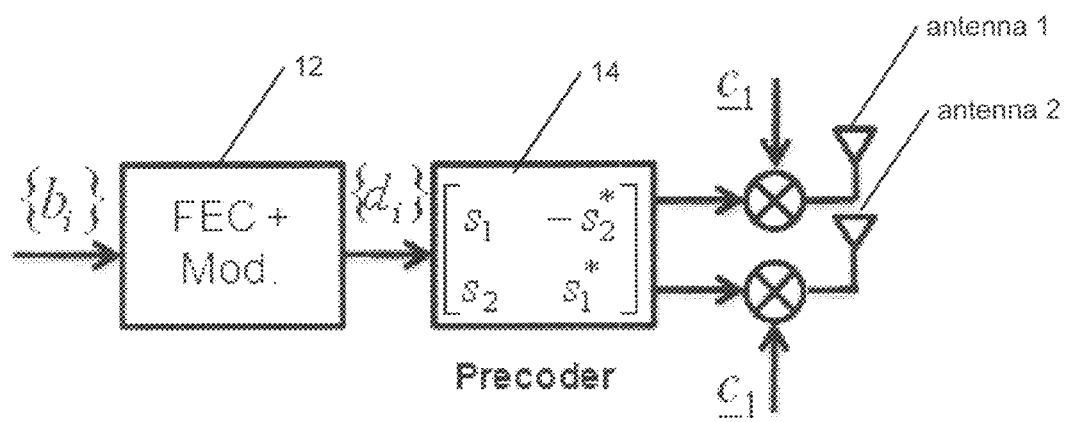
FIG. 4 is a block diagram of Space Time Block Code (STBC) illustrating how incoming information is processed and precoded before being transmitted using two antennas in a MIMO configuration.

As another example, the Space Time Block Code (STBC) TxD scheme is illustrated in FIG. 4. FIG. 4 is a block diagram of STBC illustrating how incoming information is processed and precoded before being transmitted using two antennas in a MIMO configuration. With reference to FIG. 4, FEC/modulator block 12 performs similarly as described in FIG. 3, although in FIG. 4 s1 and s2 need not be equal. In FIG. 4, MIMO precoder 14 may be an Alamouti encoder that performs over pairs of modulated symbols and generates symbols for pairs of DSs in the subframe. For example, for a given pair ($s_1$ and $s_2$) of modulated symbols, at the first DS (i.e., symbol $S_1$), $s_1$ is mapped to antenna 1 and $s_2$ is mapped to antenna 2. At the second DS, however, $-s_2''$ is mapped to antenna 1 and $s_1$ is mapped to antenna 2. For the transmission of each DS, the corresponding symbols of both antennas are multiplied by the same CS sequence CS-1. The resultant sequence for each antenna is then mapped to the subcarriers of the corresponding DS and is transmitted using OFDM. Similar to SORTD, the RS is transmitted from the two antennas using two different CS sequences. Depending upon the system implementation, in the second DS, $s_1$ and $s_2$ may be transformed using any of negation, complex conjugation, or leaving one of the symbols unchanged. In some cases, a first transformation is performed on $s_1$ while a different transformation is applied to $s_2$.

One example of the resulting CS sequence assignment for UEs is illustrated below in Table 2. Although STBC uses only one CS sequence for transmission of DS, the scheme still requires two orthogonal sequences for RS transmission. Accordingly, similarly to SORTD, the PUCCH multiplexing capacity with STBC for 12 orthogonal sequences is still 6 UEs assuming that each UE uses two transmit antennas.

TABLE 2

| UE | $S_1$ | $S_2$ | $S_3$ | $S_4$ | $S_5$ | $S_6$ | $S_7$ |
|----|-------|-------|-------|-------|-------|-------|-------|
| 1  | 1     | 1, 7  | 1     | 1     | 1     | 1, 7  | 1     |
| 2  | 2     | 2, 8  | 2     | 2     | 2     | 2, 8  | 2     |
| 3  | 3     | 3, 9  | 3     | 3     | 3     | 3, 9  | 3     |
| 4  | 4     | 4, 10 | 4     | 4     | 4     | 4, 10 | 4     |
| 5  | 5     | 5, 11 | 5     | 5     | 5     | 5, 11 | 5     |
| 6  | 6     | 6, 12 | 6     | 6     | 6     | 6, 12 | 6     |

Figure 2A:
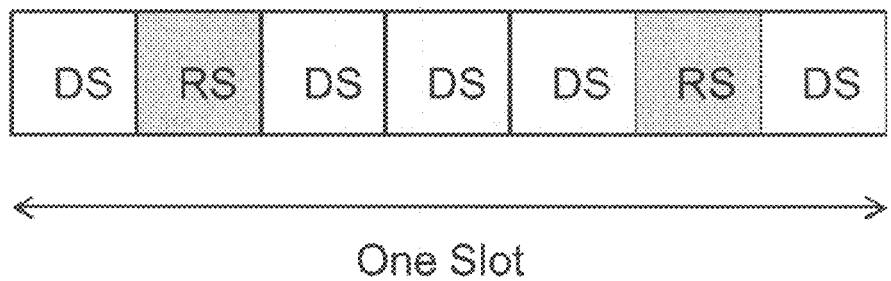
FIG. 2a is an illustration of a slot structure with a normal cyclic prefix (CP)
Figure 2B:
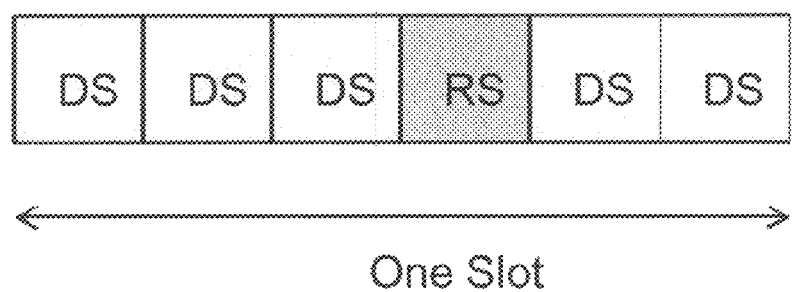
FIG. 2b is an illustration of a slot structure with an extended CP.

A second problem with STBC is that of orphan symbols. In addition to overuse of the orthogonal sequences for RS transmission, each block of STBC requires one pair of modulated symbols. Because each slot for PUCCH contains five modulated symbols for DS transmissions (see FIGS. 2a and 2b), after making two pairs of symbols, one symbol in each slot remains unpaired and leads to an orphan symbol that requires special treatment.

In some cases, the orphan symbol problem may be mitigated by transmitting the orphan symbol from both antennas at the same time. With this approach, however, no spatial diversity gain is obtained. Moreover, when the antennas are correlated, there are chances that transmitted signals are added destructively at the receiver resulting in a performance degradation. Alternatively, only one antenna may be used for transmission of the orphan symbols. With this approach, however, the power resources of one of the available transmit antennas are not used. Also, no spatial diversity gain is obtained. In some cases, the orphan symbols of two slots may be paired with one another. In that case, an MMSE receiver can be used to detect the code block composed of these two symbols. However, because the two orphan symbols from the two slots are transmitted at different frequencies and experience different channels, some performance loss may result.

In the present system and method, a UE-specific slot structure is provided in which the position of RSs in each slot is different from UE to UE. The rearrangement of RS positions allows for the allocation of additional orthogonal resources for additional UEs to be multiplexed within the same RB, leading to increased multiplexing capability for the PUCCH. The RS arrangement of the present system provides performance gains when compared to conventional RS arrangements wherein both slot structures are examined with the same number of multiplexed UEs. In some implementations of the present system, to improve the performance of STBC, as the transmit diversity, SORTD may be used for transmission of orphan symbols. In various implementations of the present system, the multiplexing capacity may be increased, for example, from 6 to 9.

In the present system, UE-specific slot structures or UE-specific slot offsets are defined so that RS locations of different UEs are distributed across the slots. By using an appropriate slot structure or offset, congestion of CS resources at specific symbols (e.g., RS symbols of Rel-8) is mitigated and unused orthogonal sequences in data symbols are made available. The additional available OSs may be used to multiplex more UEs within the same RB.

Generally, as discussed above, non-transparent TxD schemes that use one OS for data transmission use two orthogonal sequences for RS transmissions limiting their multiplexing capacity to 6 UEs. However, for each DS, only 6 orthogonal sequences are used and 6 orthogonal sequences are left unused. Accordingly, to balance the use of orthogonal sequences across different symbols in the slot, UE-specific slot structures or UE-specific slot offsets may be used so that RS locations of different UEs are distributed across the slot. In such a configuration, congestion of CS resources at specific symbols (RS symbols of Rel-8) is avoided and unused orthogonal sequences in all symbols are made available. As such, the newly available orthogonal sequences can be used to multiplex additional UEs within the same RB.

Non-transparent TxD schemes may use one OS for DSs and two OSs for RSs. In the present system, UE-specific slot structures are established such that the RS of different UEs are not transmitted on fixed symbols of the slot. As a result, the utilization of OSs are evenly distributed across the symbols of one slot and multiplexing capacity is increased. Table 3 and Table 4 illustrate example UE-specific slot structures implementing the present system. Table 3 and Table 4 show an example of the structure for normal CP and extended CP, respectively.

TABLE 3

| UE | $S_1$ | $S_2$ | $S_3$ | $S_4$ | $S_5$ | $S_6$ | $S_7$ |
|----|-------|-------|-------|-------|-------|-------|-------|
| 1  | 1, 10 | 1     | 1     | 1     | 1, 10 | 1     | 1     |
| 2  | 2     | 2, 10 | 2     | 2     | 2     | 2, 10 | 2     |
| 3  | 3     | 3     | 3, 10 | 3     | 3     | 3     | 3, 10 |
| 4  | 4, 11 | 4     | 4     | 4     | 4, 11 | 4     | 4     |
| 5  | 5     | 5, 11 | 5     | 5     | 5     | 5, 11 | 5     |
| 6  | 6     | 6     | 6, 11 | 6     | 6     | 6     | 6, 11 |
| 7  | 7, 12 | 7     | 7     | 7     | 7, 12 | 7     | 7     |
| 8  | 8     | 8, 12 | 8     | 8     | 8     | 8, 12 | 8     |
| 9  | 9     | 9     | 9, 12 | 9     | 9     | 9     | 9, 12 |

TABLE 4

| UE | $S_1$ | $S_2$ | $S_3$  | $S_4$ | $S_5$ | $S_6$ |
|----|-------|-------|--------|-------|-------|-------|
| 1  | 1     | 1     | 1      | 1     | 1, 11 | 1     |
| 2  | 2     | 2     | 2      | 2, 11 | 2     | 2     |
| 3  | 3     | 3     | 3, 11  | 3     | 3     | 3     |
| 4  | 4     | 4, 11 | 4      | 4     | 4     | 4     |
| 5  | 5, 11 | 5     | 5      | 5     | 5     | 5     |
| 6  | 6     | 6     | 6      | 6     | 6     | 6, 12 |
| 7  | 7     | 7     | 7      | 7     | 7, 12 | 7     |
| 8  | 8     | 8     | 8      | 8, 12 | 8     | 8     |
| 9  | 9     | 9     | 9, 12  | 9     | 9     | 9     |
| 10 | 10    | 10    | 10, 12 | 10    | 10    | 10    |

Referring to Table 3, RS transmissions for each UE are offset from one another allowing different UEs to use the same OS when transmitting RSs using two antennas. There is no collision in this example, because UEs that use the same OS when transmitting their RSs, transmit the RSs in different symbols. For example, as shown in Table 3, UE#1 is assigned symbols #1 and #5 for RS transmissions. When constructing and transmitting the RS, UE#1 is assigned CS-1 and CS-10 (cyclic shift orthogonal sequences with indices 1 and 10) for use in the RS transmission from antennas 1 and 2. For the DS, which will be transmitted on symbols 2, 3, 4, 6 and 7, UE#1 is assigned CS-1. UE#2 also uses CS-10 when transmitting its RSs, however UE#2 is configured to transmit RSs in symbols 2 and 6, so the RSs transmitted by UE#2 are offset from those of UE#1. UE#3 also uses CS-10 when transmitting its RSs, however UE#3 is configured to transmit RSs in symbols 3 and 7, so the RSs transmitted by UE#3 are offset from those of UE#1 and UE#2. Accordingly, CS-10 can be reused by UE#1, UE#2, and UE#3 while maintaining orthogonality between RSs. Again referring to Table 3, for UE#6, symbols #3 and #7 are to be used for UE#6's RS transmissions. When constructing and transmitting the RSs, UE#6 is assigned CS-6 and CS-11 for UE#6's RS transmission on antennas 1 and 2, respectively, while UE#6's DS will be transmitted on symbols 1, 2, 4, 5 and 6 using CS-6.

Table 3 and Table 4 show slot structures of the present system that allow all 12 OS resources to be fully utilized without compromising OS orthogonality. This leads to increased multiplexing capability for UEs. In the specific examples illustrated in Table 3 and Table 4, the number of multiplexed UEs for normal CP equals 9, whereas 10 UEs can be multiplexed in the case of extended CP. Accordingly, the present system may be used to increase the multiplexing capacity of the supported TxD schemes (e.g., category 2 described above) from 6 to 9 for normal CP and 10 for extended CP, respectively.

Although the present system is illustrated using a single slot, it is possible to jointly design the slot structures of two slots of a subframe. As such, a UE may use different slot structures in the two slots of a subframe. For example, a UE that uses symbols S1 and S5 for RS transmission in the first slot of a subframe, may be configured to use symbols S9 and S13 (instead of S8 and S12) in the second slot. Accordingly, a first slot structure may be defined for a first slot within a subframe, while a second slot structure having a different configuration than the first slot structure is defined for the second slot of the subframe.

The present system is generally backward compatible to LTE Rel-8 UEs. Backward compatibility is facilitated because sequences for both DS and RS are chosen from the same CS OS set. Accordingly, rearranging the location of RS and DS does not break the orthogonality amongst UEs, even for Rel-8 UEs. Furthermore, among the 9 or 10 UE-specific slot structures illustrated in Table 3 and Table 4, respectively, there exists 3 or 2 Rel-8 slot structures that can be reserved and assigned specifically to Rel-8 UEs. Those UE-specific slot structures are transparent to Rel-8 UEs, and, accordingly, Rel-8 and Rel-10 UEs may be mixed in such structures with some Rel-8 UEs being assigned the Rel-8 compatible slots, while the remaining slot structures are assigned to Rel-10 UEs. Because OS orthogonality is maintained in the described UE-specific slot structure, performance degradation for Rel-8 UEs is minimized.

As an example of a slot structure incorporating Rel-8 UEs, Table 5 illustrates an alternative to Table 3 in which 4 UEs (UE1, UE2, UE3, and UE4) are Rel-8 UEs and so use a single OS to encode their RSs as they only are configured to use a single antenna. UE5-UE10 may be reserved for Rel-10 UEs. With this scheme up to 10 (Rel-8 and Rel-10) UEs can be multiplexed in the same RB. In some implementations, as it is preferred that Rel-10 UE be backward compatible to Rel-8, the above mentioned Rel-8 UE could also include those Rel-10 UEs which work in a Rel-8 transmission mode, for example in a single antenna mode.

TABLE 5

| UE | $S_1$ | $S_2$ | $S_3$ | $S_4$ | $S_5$ | $S_6$ | $S_7$ |
|----|-------|-------|-------|-------|-------|-------|-------|
| 1  | 1     | <u>1</u> | 1     | 1     | 1     | <u>1</u> | 1     |
| 2  | 2     | <u>2</u> | 2     | 2     | 2     | <u>2</u> | 2     |
| 3  | 3     | <u>3</u> | 3     | 3     | 3     | <u>3</u> | 3     |
| 4  | 4     | <u>4</u> | 4     | 4     | 4     | <u>4</u> | 4     |
| 5  | <u>5, 11</u> | 5 | 5 | 5 | 5 | <u>5, 11</u> | 5 | 5 |
| 6  | 6     | <u>6, 11</u> | 6 | 6     | 6     | <u>6, 11</u> | 6 |
| 7  | 7     | 7     | <u>7, 11</u> | 7 | 7     | 7     | <u>7, 11</u> |
| 8  | <u>8, 12</u> | 8 | 8 | 8 | 8 | <u>8, 12</u> | 8 |
| 9  | 9     | <u>9, 12</u> | 9 | 9 | 9 | 9 | <u>9, 12</u> | 9 |
| 10 | 10    | 10    | <u>10, 12</u> | 10 | 10 | 10 | <u>10, 12</u> |

If the number of Rel-8 UEs that need to be scheduled is more than the existing Rel-8 slot structures, UE indices that correspond to new slot structures can be assigned to Rel-8 UEs. Because a Rel-8 UE uses only one OS at a time, Rel-8 UE's may ignore the assigned slot structure and only use the assigned OS (by Rel-8 slot structure) instead. For example, referring to Table 3, if the slot identified by UE index 3 is considered for a Rel-8 UE, the UE can use OS index 3 with a Rel-8 slot structure rather than the slot structure considered for UE index 3. Because, OS index 10 is not used by this UE, the orthogonality of OS among different UEs is preserved.

If it is known that the number of Rel-8 UEs is relatively large compared to the number of Rel-10 UEs, for example at the initial deployment of LTE-A, then in the configuration of the UE-specific slot structure, some of the UE indices can be specifically dedicated to Rel-8 UEs, possibly allowing for a more efficient multiplexing of Rel-10 and Rel-8 UEs. For example, some PUCCH RBs can be completely reserved and configured for Rel-8 UEs to make sure there are enough resources to support legacy Rel-8 UEs. As more LTE-A UEs access the network services, increasing numbers of the present UE-specific slot structures may be configured to support both Rel-8 and Rel-10 UEs, or support only Rel-10 UEs.

The present system may be used in circumstances where the potential locations of the RS are restricted. For example, if extended CP symbols S1 and S6 are not allowed to carry RS (for example to avoid performance degradation for high speed UEs), alternative configurations of the present slot structure can be implemented to maintain support for more than 6 UEs. In some cases, the number of supported UEs in this case may be less than 10.

In some cases, a base station will configure a slot allocation for a UE. The slot allocation may then be communicated to the UE. The slot allocation includes information (or implicitly identifies information) that allow the UE to determine the slot structure to be used when transmitting to the base station using PUCCH. As such, the assignment of slot structure and OS (i.e., slot allocation) can be implicitly signaled to the UE, to avoid signaling overhead. For example, in LTE, the cqi-pucch resource index is semi-statically signaled to the UE via higher layer signaling such as RRC signaling. This resource index, which is unique for each UE in each subframe, may be used by the UE to determine the slot structure, including which RB and which OS indices should be used in the corresponding subframe. In the same way, a one-to-one mapping between this resource index and the slot structure, the OS, and the RB used for transmitting the PUCCH can be defined in LTE-A. For example, one resource index value may correspond to a particular RB reserved for PUCCH format 2/2a/2b and the configuration (i.e. slot structure and corresponding OS) in each row shown in Table 3 and Table 4. Accordingly, without any signaling overhead, each UE can recognize the specific slot structure and the associated OSs based upon the UE's resource index for PUCCH format 2. For the Semi-persistent Scheduling (SPS) service, the assignment of slot structure and OS can be implicitly signaled to the UE by any reserved field in the SPS activation signaling, for example, indicated by the 'TPC command for PUCCH'. Other reserved fields are also possible.

Alternatively, the assignment of slot structure and OS (i.e., slot allocation) may be explicitly conveyed to the Rel-10 UE, semi-statically or dynamically, through higher layer signaling or physical layer control signaling. In one example, explicit signaling can be performed by signaling an index for RB, an index for the OS of DS, an index for the first OS of RS, and an index for the second OS of RS. For the RS, the base station may signal a bitmap indicating the slot structure.

If the signaling is via high-layer signaling, overhead may not be a significant concern. However, to further optimize the signaling load, a table-based or list-based scheme may be used. For example, a table such as those illustrated in Table 3 or Table 4 may be established and assigned an index that is used to represent different schemes known to both the base station and the UE. In that case, the table index as well as the cqi-pucch resource index is signaled to the UE. This resource index tells the UE which row of the specified table is assigned to the UE. Generally, any indicator may be used to signal the slot structure to a UE.

The use of explicit signaling to inform the UE about a particular slot structure may introduce flexibility in UE scheduling. For example, the base station does not have to be bound to a specific slot structure and OS assignment scheme, such as those illustrated in Table 3 and Table 4. Instead, the base station may have several alternative schemes, which can be used depending upon traffic loading, channel conditions. For example, if there are more than 3 Rel-8 UEs that need to be scheduled in the same RB, the base station can switch from Table 3 to a scheme that provides additional Rel-8 slot structures such as that illustrated in Table 5. Alternatively, in high Doppler frequency channel conditions, the base station can switch from Table 4 to a scheme that avoids using symbols S1 and S6 for RS transmissions.

The assignment of OS to slot structures may be defined such that the CS indices in different slot structures are relatively far apart from one another. Accordingly, when loading is low, different slot structures may be assigned to the UEs (OS balancing) and, automatically, UEs use CS indices that are far apart from one another. This may result in improved orthogonality amongst UEs resulting in more accurate channel estimation and data detection.

When performing assignment of slot structure and assignment of OSs using implicit or explicit signaling, the semi-static nature of the values can be used to introduce additional efficiencies into the present system. For example, the base station may select specific slot structures based upon traffic loading and available PUCCH resources. When loading is low, namely, there are a small number of UEs that require to transmit PUCCH, the base station may assign different slot structures (for example, the first several rows of Table 3) to the UEs. This kind of slot structure assignment prevents unbalanced utilization of the OS resources. However, when the load is high, the base station could assign all available slot structures (for example, all the slot structures illustrated in either Table 3 or Table 4). Generally it is preferable to allocate the slot structure and OS, so that OS utilization is distributed evenly across DS and RS.

The base station may also be configured to assign different slot structures to different UEs based upon their mobility or based upon uplink interference knowledge. For example, the base station may assign slot structures having more balanced RS positions (RS on symbols 2 and 6, for example) to UEs with relatively high mobility to maintain channel estimation performance, while the base station may assign slot structures with unbalanced RS locations (for example RS on symbols 1 and 5) to UEs with low mobility where the location of the RSs does not strongly affect channel estimation performance.

Figure 5:
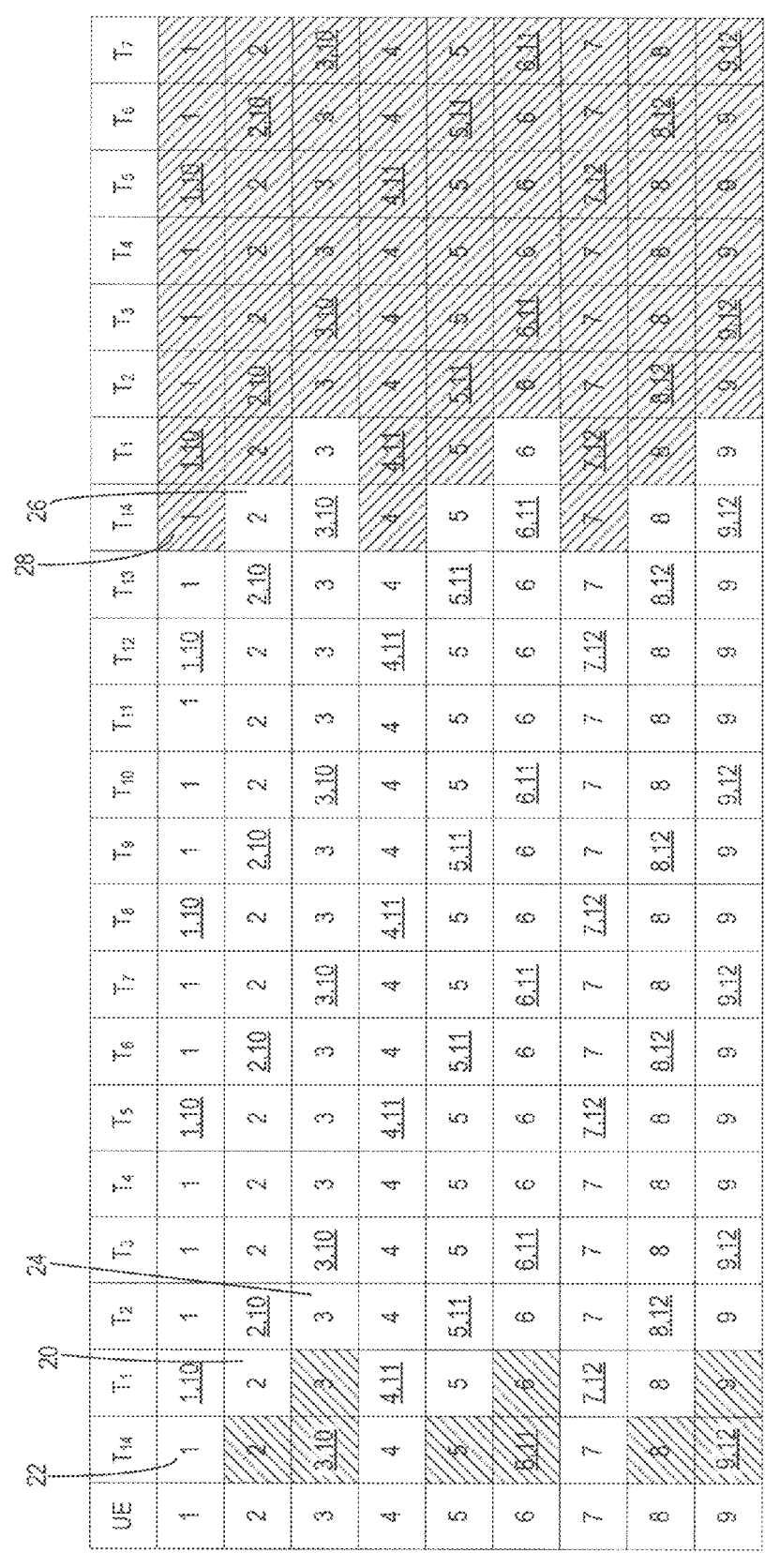
Figure 6:
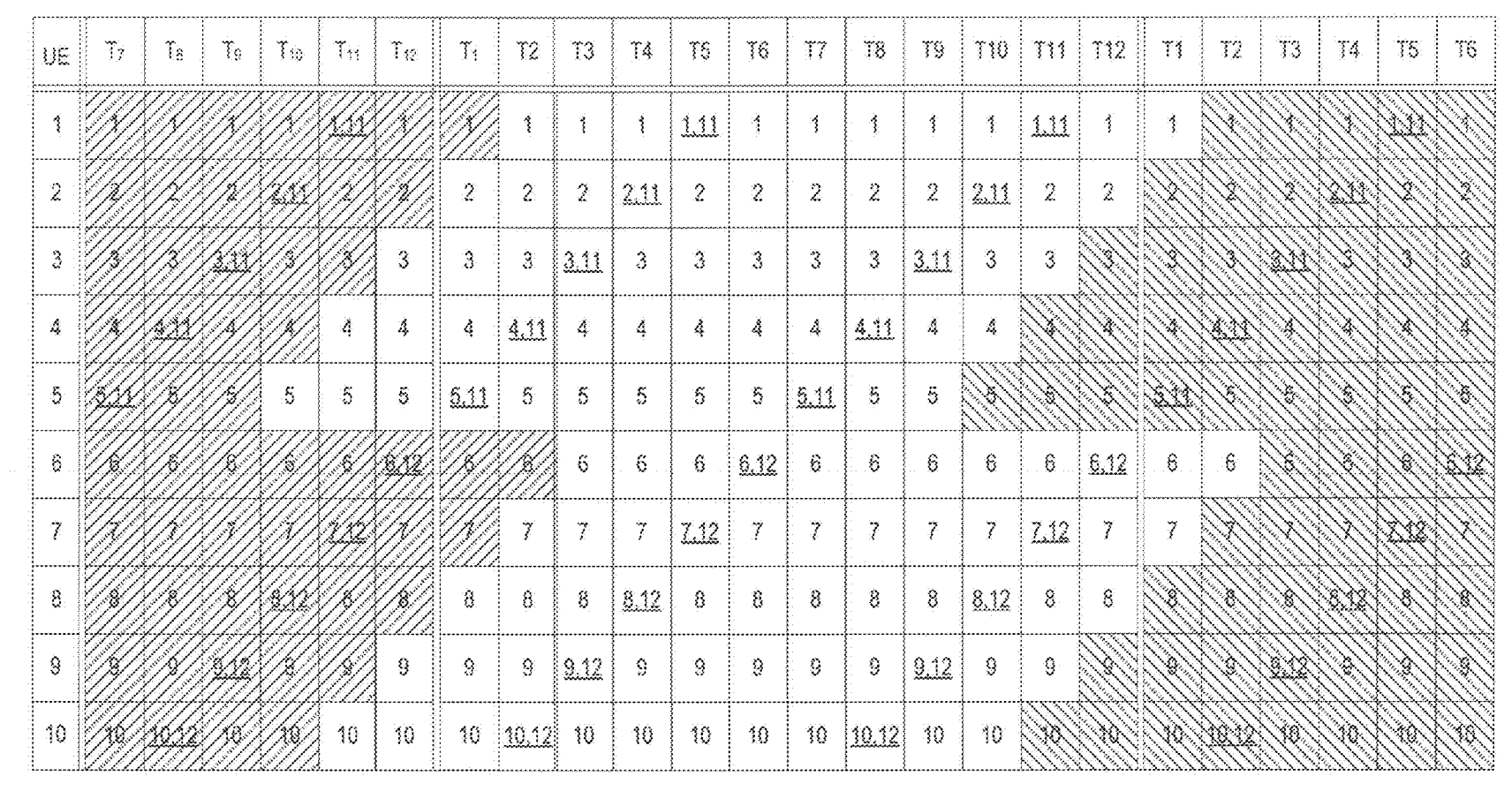

In some cases, the present system may be implemented as a time shift of each slot assigned to each UE, with the time shift causing different UEs to transmit DS and RS at different times or in different symbols. As such, a UE-specific relative delay or timing advance may be implemented between PUCCHs while using the existing PUCCH slot structure. This timing advance would be different from the one in Release 8 LTE that adjusts uplink frame timing. The UE-specific delay or timing advance would adjust the delay at which PUCCH is transmitted relative to downlink frame timing, but not the delay at which PUSCH is transmitted relative to downlink frame timing. FIGS. 5 and 6 are illustrations of transmission slots being implemented using a UE-specific relatively delay and illustrate normal and extended CP cases, respectively. In FIGS. 5 and 6 symbol times are indicated with T with maximum indices corresponding to the 12 or 14 OFDM symbols in a subframe. Consecutive, similarly shaded symbols on a row represent one subframe transmission from a single UE.

Referring to FIG. 5, UE#2 is set to have zero delay relative to normal PUCCH timing. Accordingly, DS transmission 20 is the first of UE#2's transmission and occurs during symbol T1. Conversely, UE#1 is set to begin transmitting one symbol earlier. Accordingly, UE#1's first transmission 22 occurs during symbol T14. By transmitting one symbol earlier, the RS transmissions of UEs #1 and #2 are offset from one another. As such, both UE#1 and UE#2 can use OS CS-10 without interfering with one another. Similarly, UE#3 is set to begin transmitting one symbol later. Accordingly, UE#3's first transmission 24 occurs during symbol T2. By transmitting one symbol later, the RS transmissions of UEs #1, #2 and #3 are offset from one another. As such, UEs #1, #2 and #3 can use CS-10 without interfering with one another.

Considering FIG. 5, up to 9 UEs can simultaneously transmit on the PUCCH resource without inter-user interference. This is enabled by delaying or advancing a UEs transmission relative to normal PUCCH timing by one OFDM symbol. (In the example of FIG. 5, UEs 1, 4, and 7 are advanced by one OFDM symbol, and UEs 3, 6, and 9 are each delayed by one OFDM symbol.) Due to the delay, different groups of UEs overlap in time on the first or last two OFDM symbols of a subframe. The different transmission of each UE is distinguished using shading.

FIG. 6 shows an implementation of the UE-specific relative delay when extended CP is used. Because there is only one RS per slot and there are more possible positions for the RS within the slot, slightly more UEs can be multiplexed within the same subframe than when the normal CP is used. In this case, up to 10 UEs may be multiplexed with UE-specific relative delay with extended CP, as compared to 9 with the normal CP.

The present slot offset approach is generally compatible with Rel-8 as the position of an RS within a slot is unchanged, enabling the same channel estimation approaches to be used. Furthermore, when a single UE occupies the PUCCH, impairments such as channel non-stationarity or multipath have the same performance degradation as Rel-8.

In some cases, the present slot offset may result in a more complicated PUSCH transmission implementation. For example, because PUSCH is not delayed, if a UE is to transmit a PUSCH in the next subframe after the UE transmits a delayed PUCCH, the UE must simultaneously transmit the PUCCH and PUSCH for one OFDM symbol in the first or last symbol of a subframe. Accordingly, transmission may be constrained so that a UE is not required to transmit a PUSCH in the next subframe after the UE transmits a delayed PUCCH. (Note: because the PUCCH and PUSCH are never transmitted on the same subcarriers in LTE, the availability of PUSCH subcarriers is not affected by delaying the PUCCH, nor is there additional interference to PUSCH from the delayed PUCCHs.)

Furthermore, multi-user detection receivers can be more difficult to implement, because more groups of users can interfere with one another. For example, if there is multipath fading, a UE in a first group of users is interfered with only by the other UEs in the first group over most of the frame, but can be interfered with by a mixture of users from the first and second or third groups of UEs in up to the first or last symbol of a subframe. For example, referring to FIG. 5, during transmission of DS 26, UE#2 may be interfered with by DS transmission 28, which may be transmitted by a different user in a different group. However, because this interference only result in 2 of the 14 symbols in a UE's subframe, and the use of multiuser detection receivers for PUCCH may not be widespread, this disadvantage may not be severe.

The present UE-specific slot offset is similar to the UE specific slot structure in that Rel-8 UEs can be transmitted on the same subcarriers as those with a UE specific slot offset. The Rel-8 UEs may transmit with no offset.

An alternative approach to UE-specific slot offset is UE-specific UL frame timing shift, i.e. shifting the UL frame timing by ±1 symbols to obtain the desired RS time shift. One potential problem of this approach is that SRS and PUSCH can interfere: While scheduling might avoid this, if SRS is used often, it might be better to have UEs transmit SRS with a ±1 symbol offset, to synchronize them with the rest of the cell.

In one implementation of the present system, a combination of STBC and SORTD is used to provide a TxD scheme for PUCCH. Four symbols in each slot form two pairs of symbols which are transmitted using an Alamouti precoder, as described above. After encoding, a single orphan symbol remains in each slot. In the present system, the orphan symbols are transmitted using the SORTD method described above. As such, after encoding a slot in accordance with the present system, each slot includes three types of symbols: RS using two orthogonal sequences for the two antennas, DS using one orthogonal sequence (DS1) (DS1 symbols are transmitted using the Alamouti code), and DS using two orthogonal sequences (DS2) (the DS2 symbols are the orphan symbols and are transmitted using SORTD).

If the slot structure of Rel-8 is used, similar to STBC and SORTD, the multiplexing capacity of this method is equal to 6. This limitation is set by RS and DS2 types of symbols which use two orthogonal sequences.

Figure 7:
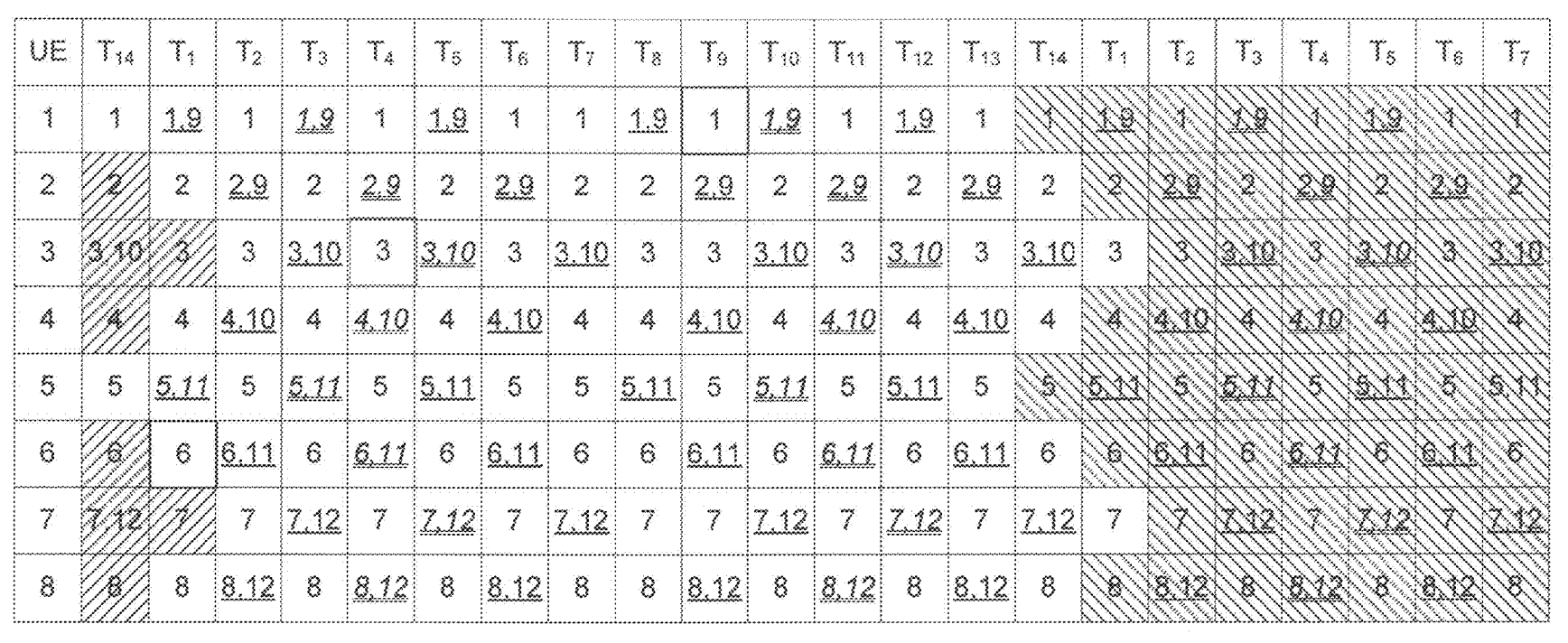

If, however, STBC+SORTD is used in combination with the UE-specific slot structure or UE-specific slot offset described above, this scheme may provide an increased multiplexing capacity. For example, Table 6 and Table 7 below illustrate examples of UE-specific slot structure for STBC+SORTD with normal CP and extended CP, respectively. In each table, underlined values represent RS, while the values in italics and double-underlined represent a symbol including an orphan symbol (DS2) that has been encoded in accordance with SORTD. As another example, FIG. 7 is an illustration of a UE-specific slot offset for STBC+SORTD with normal CP. In Table 6 and Table 7, $S_i$ denotes the $i^{th}$ symbol in the slot.

In Table 6 and Table 7, and FIG. 7, the OSs are indexed from 1 to 12. The indices below $S_i$ show the OSs used by the corresponding UE at the $i^{th}$ symbol. For example, referring to Table 6, UE#1 is assigned symbols #1 and #5 for its RS transmission, and CS-1 and CS-9 are allocated for its RS transmission from antennas 1 and 2, while for the DS1 symbols, which will be transmitted on symbols 2, 3, 6, and 7, CS-1 will be used, and consecutive symbols such as {S2 S3} and {S6 S7} will be transmitted after Alamouti coding. For UE#1, DS2 will be transmitted on symbol S3 using two orthogonal sequences, CS-1 and CS-9, one for each antenna.

TABLE 6

| UE | $S_1$ | $S_2$ | $S_3$ | $S_4$ | $S_5$ | $S_6$ | $S_7$ |
|---|---|---|---|---|---|---|---|
| 1 | 1, 9 | 1 | 1, 9 | 1 | 1, 9 | 1 | 1 |
| 2 | 2 | 2, 9 | 2 | 2, 9 | 2 | 2, 9 | 2 |
| 3 | 3 | 3 | 3, 10 | 3 | 3, 10 | 3 | 3, 10 |
| 4 | 4 | 4, 10 | 4 | 4, 10 | 4 | 4, 10 | 4 |
| 5 | 5, 11 | 5 | 5, 11 | 5 | 5, 11 | 5 | 5 |
| 6 | 6 | 6, 11 | 6 | 6, 11 | 6 | 6, 11 | 6 |
| 7 | 7 | 7 | 7, 12 | 7 | 7, 12 | 7 | 7, 12 |
| 8 | 8 | 8, 12 | 8 | 8, 12 | 8 | 8, 12 | 8 |

TABLE 7

| UE | $S_1$ | $S_2$ | $S_3$ | $S_4$ | $S_5$ | $S_6$ |
|---|---|---|---|---|---|---|
| 1 | 1, 10 | 1 | 1, 10 | 1 | 1 | 1 |
| 2 | 2 | 2, 10 | 2 | 2, 10 | 2 | 2 |
| 3 | 3 | 3 | 3 | 3 | 3, 10 | 3, 10 |
| 4 | 4, 11 | 4 | 4 | 4, 11 | 4 | 4 |
| 5 | 5 | 5 | 5, 11 | 5 | 5, 11 | 5 |
| 6 | 6 | 6, 11 | 6 | 6 | 6 | 6, 11 |
| 7 | 7, 12 | 7 | 7, 12 | 7 | 7 | 7 |
| 8 | 8 | 8, 12 | 8 | 8, 12 | 8 | 8 |
| 9 | 9 | 9 | 9 | 9 | 9, 12 | 9, 12 |

The pattern used for the UE-Specific offset based approach in FIG. 7 may be similar to the approach illustrated in Table 6. However, in FIG. 7 some UEs transmit with a delay or advance, which allows the same slot structure to be used for all UEs. The ability to have the same slot structure for all UEs in FIG. 7 results from the pattern of Table 6 in which the location of the orphan symbol (DS2) relative to the location of RS is the same for all slot structures.

In Table 6, a UE-specific slot structure is given in which the location of the orphan symbol (DS2) relative to the location of RS is the same for all UEs. As shown in Table 6, most of the paired symbols (for Alamouti encoding) are apart from each other by one symbol (RS or orphan symbol). This may lead to performance degradation at high UE speeds. An alternative pattern is shown in Table 8, in which the number of paired symbols in which the individual symbols are next to each other is increased over that shown in Table 6.

TABLE 8

| UE | $S_1$ | $S_2$ | $S_3$ | $S_4$ | $S_5$ | $S_6$ | $S_7$ |
|---|---|---|---|---|---|---|---|
| 1 | 1, 9 | 1 | 1 | 1, 9 | 1, 9 | 1 | 1 |
| 2 | 2 | 2, 9 | 2 | 2 | 2 | 2, 9 | 2, 9 |
| 3 | 3 | 3 | 3, 10 | 3, 10 | 3 | 3 | 3, 10 |
| 4 | 4, 10 | 4, 10 | 4 | 4 | 4 | 4, 10 | 4 |
| 5 | 5, 11 | 5 | 5 | 5, 11 | 5, 11 | 5 | 5 |
| 6 | 6 | 6, 11 | 6 | 6 | 6 | 6, 11 | 6, 11 |
| 7 | 7 | 7 | 7, 12 | 7, 12 | 7 | 7 | 7, 12 |
| 8 | 8, 12 | 8, 12 | 8 | 8 | 8 | 8, 12 | 8 |

A potential disadvantage of the example implementation illustrated in Table 6 and Table 8 is that they include two symbols in which only 10 OS are used (see symbols $S_1$ and $S_7$ of Table 6 and symbols $S_3$ and $S_5$ of Table 8), whereas in the other 5 symbols all 12 OS are used. Other schemes may be developed in which the use of OS resources is more balanced across a particular slot. An example of such a scheme is shown in Table 9. The drawback of this scheme is that for UE #8, there exists a pair of Alamouti encoded symbols which have two other symbols between them. This may introduce some performance degradation for this UE at high speeds.

TABLE 9

| UE | $S_1$ | $S_2$ | $S_3$ | $S_4$ | $S_5$ | $S_6$ | $S_7$ |
|---|---|---|---|---|---|---|---|
| 1 | 1, 9 | 1 | 1 | 1, 9 | 1, 9 | 1 | 1 |
| 2 | 2 | 2, 9 | 2 | 2 | 2 | 2, 9 | 2, 9 |
| 3 | 3 | 3 | 3, 10 | 3, 10 | 3 | 3 | 3, 10 |
| 4 | 4, 10 | 4, 10 | 4 | 4 | 4 | 4, 10 | 4 |
| 5 | 5, 11 | 5 | 5, 11 | 5 | 5, 11 | 5 | 5 |
| 6 | 6 | 6, 11 | 6 | 6 | 6 | 6, 11 | 6, 11 |
| 7 | 7 | 7 | 7, 12 | 7, 12 | 7 | 7 | 7, 12 |
| 8 | 8 | 8, 12 | 8 | 8 | 8, 12 | 8, 12 | 8 |

It can be seen from Table 6, Table 7, Table 8, and Table 9 that by using the present TxD scheme, all 12 OS can be fully utilized without compromising OS orthogonality, and orphan symbols will maintain reasonable performance without consideration of pairing. In these examples, the number of multiplexed UEs for normal CP is equal to 8, whereas 9 UEs can be multiplexed in the case of extended CP.

The present TxD scheme allow for configurations that accommodate a maximum number of UEs in each RB. It should be noted, however, that the examples shown in Table 6, Table 7, Table 8, Table 9, and FIG. 7 are only examples as other slot configuration including alternative allocations of RS, DS1 and DS2 to available symbols may be implemented.

Figure 8:
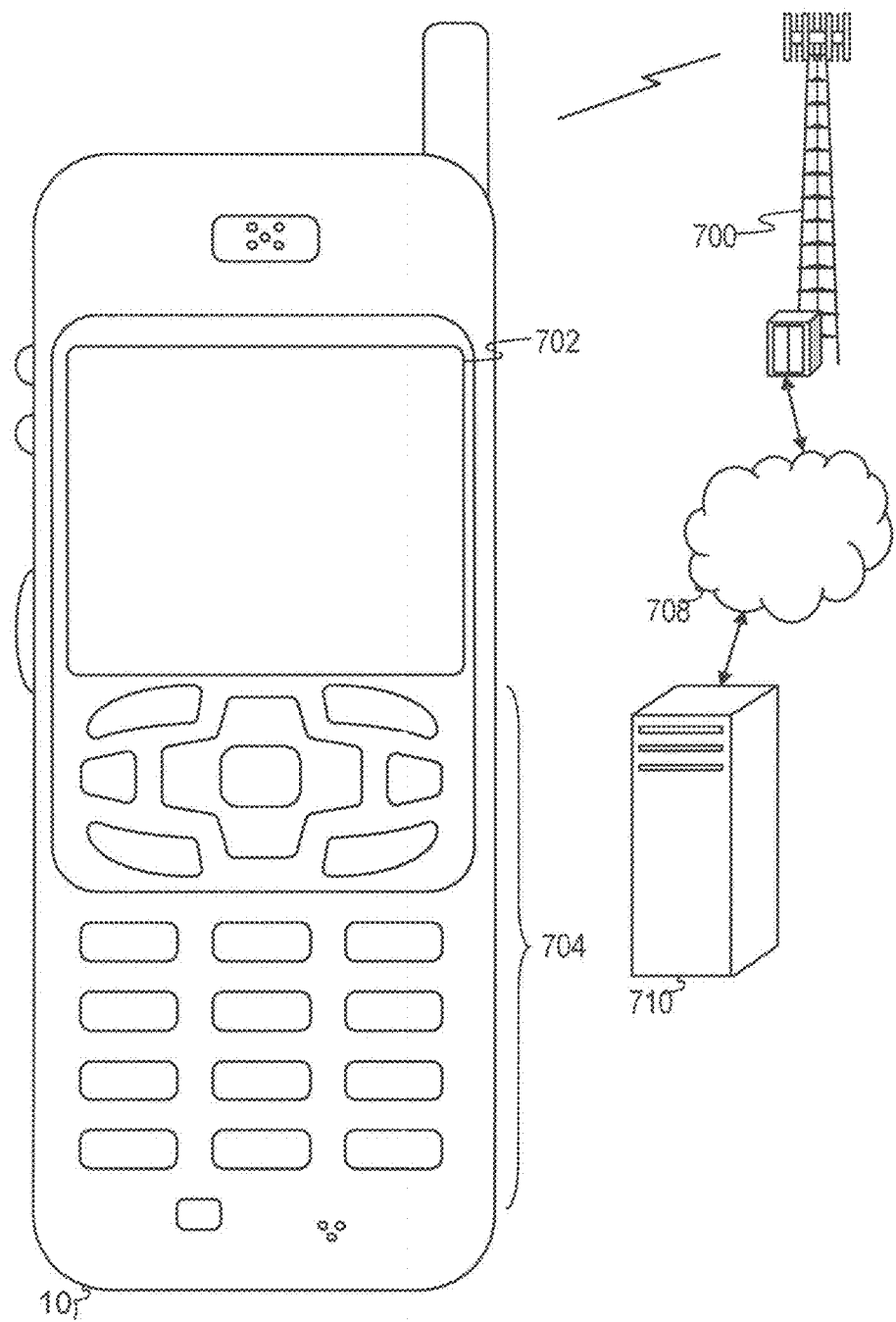
FIG. 8 is a diagram of a wireless communications system including a UE operable for some of the various embodiments of the disclosure.

FIG. 8 illustrates a wireless communications system including an embodiment of a UE 10. UE 10 is operable for implementing aspects of the disclosure, but the disclosure should not be limited to these implementations. Though illustrated as a mobile phone, the UE 10 may take various forms including a wireless handset, a pager, a personal digital assistant (PDA), a portable computer, a tablet computer, a laptop computer. Many suitable devices combine some or all of these functions. In some embodiments of the disclosure, the UE 10 is not a general purpose computing device like a portable, laptop or tablet computer, but rather is a special-purpose communications device such as a mobile phone, a wireless handset, a pager, a PDA, or a telecommunications device installed in a vehicle. The UE 10 may also be a device, include a device, or be included in a device that has similar capabilities but that is not transportable, such as a desktop computer, a set-top box, or a network node. The UE 10 may support specialized activities such as gaming, inventory control, job control, and/or task management functions, and so on.

The UE 10 includes a display 702. The UE 10 also includes a touch-sensitive surface, a keyboard or other input keys generally referred as 704 for input by a user. The keyboard may be a full or reduced alphanumeric keyboard such as QWERTY, Dvorak, AZERTY, and sequential types, or a traditional numeric keypad with alphabet letters associated with a telephone keypad. The input keys may include a trackwheel, an exit or escape key, a trackball, and other navigational or functional keys, which may be inwardly depressed to provide further input function. The UE 10 may present options for the user to select, controls for the user to actuate, and/or cursors or other indicators for the user to direct.

The UE 10 may further accept data entry from the user, including numbers to dial or various parameter values for configuring the operation of the UE 10. The UE 10 may further execute one or more software or firmware applications in response to user commands. These applications may configure the UE 10 to perform various customized functions in response to user interaction. Additionally, the UE 10 may be programmed and/or configured over-the-air, for example from a wireless base station, a wireless access point, or a peer UE 10.

Among the various applications executable by the UE 10 are a web browser, which enables the display 702 to show a web page. The web page may be obtained via wireless communications with a wireless network access node, a cell tower, a peer UE 10, or any other wireless communication network or system 700. The network 700 is coupled to a wired network 708, such as the Internet. Via the wireless link and the wired network, the UE 10 has access to information on various servers, such as a server 710. The server 710 may provide content that may be shown on the display 702. Alternately, the UE 10 may access the network 700 through a peer UE 10 acting as an intermediary, in a relay type or hop type of connection.

Figure 9:
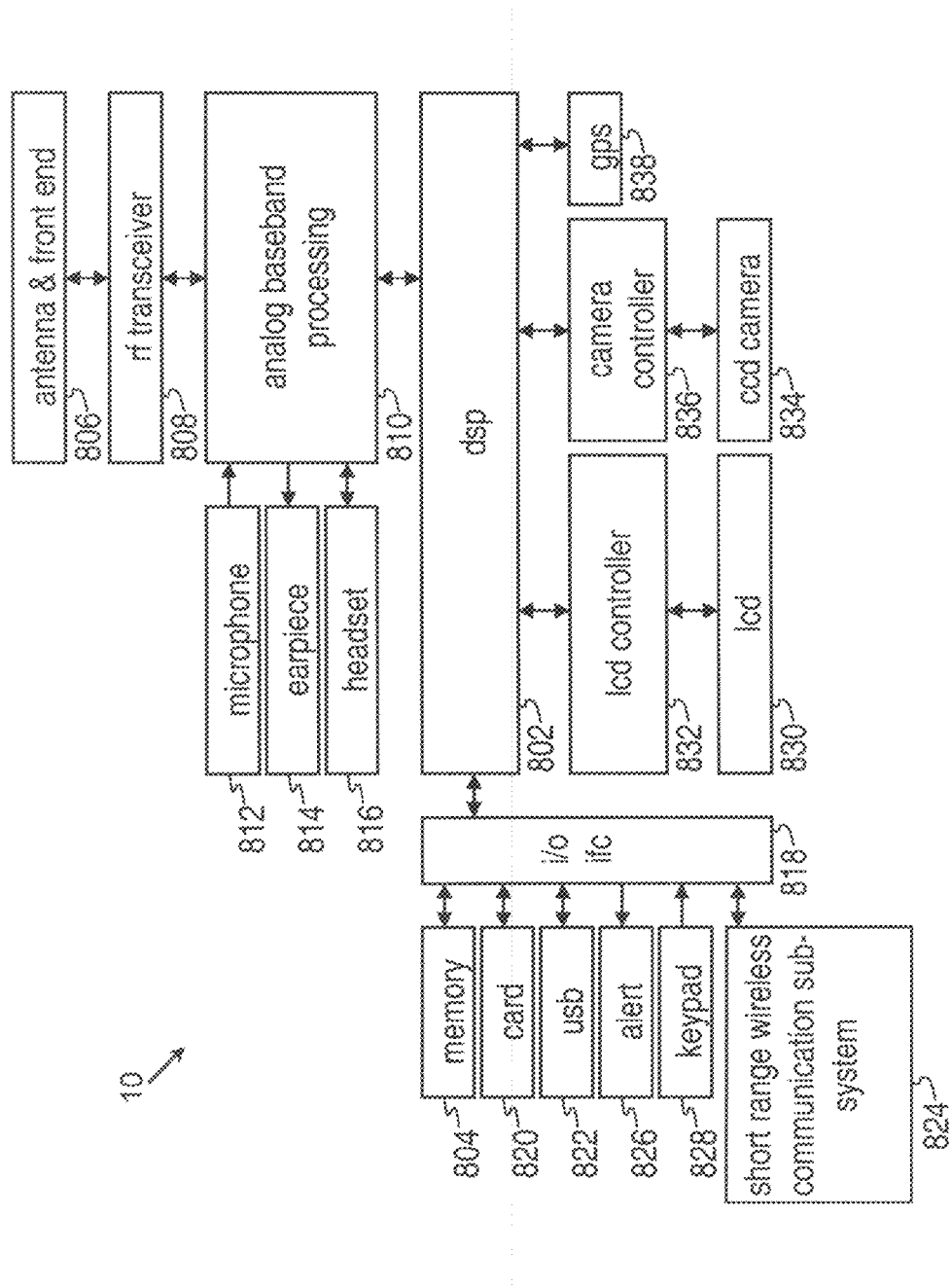
FIG. 9 is a block diagram of a UE operable for some of the various embodiments of the disclosure.

FIG. 9 shows a block diagram of the UE 10. While a variety of known components of UEs 110 are depicted, in an embodiment a subset of the listed components and/or additional components not listed may be included in the UE 10. The UE 10 includes a digital signal processor (DSP) 802 and a memory 804. As shown, the UE 10 may further include an antenna and front end unit 806, a radio frequency (RF) transceiver 808, an analog baseband processing unit 810, a microphone 812, an earpiece speaker 814, a headset port 816, an input/output interface 818, a removable memory card 820, a universal serial bus (USB) port 822, a short range wireless communication sub-system 824, an alert 826, a keypad 828, a liquid crystal display (LCD), which may include a touch sensitive surface 830, an LCD controller 832, a charge-coupled device (CCD) camera 834, a camera controller 836, and a global positioning system (GPS) sensor 838. In an embodiment, the UE 10 may include another kind of display that does not provide a touch sensitive screen. In an embodiment, the DSP 802 may communicate directly with the memory 804 without passing through the input/output interface 818.

The DSP 802 or some other form of controller or central processing unit operates to control the various components of the UE 10 in accordance with embedded software or firmware stored in memory 804 or stored in memory contained within the DSP 802 itself. In addition to the embedded software or firmware, the DSP 802 may execute other applications stored in the memory 804 or made available via information carrier media such as portable data storage media like the removable memory card 820 or via wired or wireless network communications. The application software may comprise a compiled set of machine-readable instructions that configure the DSP 802 to provide the desired functionality, or the application software may be high-level software instructions to be processed by an interpreter or compiler to indirectly configure the DSP 802.

The antenna and front end unit 806 may be provided to convert between wireless signals and electrical signals, enabling the UE 10 to send and receive information from a cellular network or some other available wireless communications network or from a peer UE 10. In an embodiment, the antenna and front end unit 806 may include multiple antennas to support beam forming and/or multiple input multiple output (MIMO) operations. As is known to those skilled in the art, MIMO operations may provide spatial diversity which can be used to overcome difficult channel conditions and/or increase channel throughput. The antenna and front end unit 806 may include antenna tuning and/or impedance matching components, RF power amplifiers, and/or low noise amplifiers.

The RF transceiver 808 provides frequency shifting, converting received RF signals to baseband and converting baseband transmit signals to RF. In some descriptions a radio transceiver or RF transceiver may be understood to include other signal processing functionality such as modulation/demodulation, coding/decoding, interleaving/deinterleaving, spreading/despreading, inverse fast Fourier transforming (IFFT)/fast Fourier transforming (FFT), cyclic prefix appending/removal, and other signal processing functions. For the purposes of clarity, the description here separates the description of this signal processing from the RF and/or radio stage and conceptually allocates that signal processing to the analog baseband processing unit 810 and/or the DSP 802 or other central processing unit. In some embodiments, the RF Transceiver 808, portions of the Antenna and Front End 806, and the analog base band processing unit 810 may be combined in one or more processing units and/or application specific integrated circuits (ASICs).

The analog base band processing unit 810 may provide various analog processing of inputs and outputs, for example analog processing of inputs from the microphone 812 and the headset 816 and outputs to the earpiece 814 and the headset 816. To that end, the analog base band processing unit 810 may have ports for connecting to the built-in microphone 812 and the earpiece speaker 814 that enable the UE 10 to be used as a cell phone. The analog base band processing unit 810 may further include a port for connecting to a headset or other hands-free microphone and speaker configuration. The analog base band processing unit 810 may provide digital-to-analog conversion in one signal direction and analog-to-digital conversion in the opposing signal direction. In some embodiments, at least some of the functionality of the analog base band processing unit 810 may be provided by digital processing components, for example by the DSP 802 or by other central processing units.

The DSP 802 may perform modulation/demodulation, coding/decoding, interleaving/deinterleaving, spreading/despreading, inverse fast Fourier transforming (IFFT)/fast Fourier transforming (FFT), cyclic prefix appending/removal, and other signal processing functions associated with wireless communications. In an embodiment, for example in a code division multiple access (CDMA) technology application, for a transmitter function the DSP 802 may perform modulation, coding, interleaving, and spreading, and for a receiver function the DSP 802 may perform despreading, deinterleaving, decoding, and demodulation. In another embodiment, for example in an orthogonal frequency division multiplex access (OFDMA) technology application, for the transmitter function the DSP 802 may perform modulation, coding, interleaving, inverse fast Fourier transforming, and cyclic prefix appending, and for a receiver function the DSP 802 may perform cyclic prefix removal, fast Fourier transforming, deinterleaving, decoding, and demodulation. In a single carrier frequency division multiple access (SC-FDMA) technology application, DSP 802 may perform similar functions to the OFDMA transmitter, but may additionally perform a fast Fourier transform. In other wireless technology applications, yet other signal processing functions and combinations of signal processing functions may be performed by the DSP 802.

The DSP 802 may communicate with a wireless network via the analog baseband processing unit 810. In some embodiments, the communication may provide Internet connectivity, enabling a user to gain access to content on the Internet and to send and receive e-mail or text messages. The input/output interface 818 interconnects the DSP 802 and various memories and interfaces. The memory 804 and the removable memory card 820 may provide software and data to configure the operation of the DSP 802. Among the interfaces may be the USB interface 822 and the short range wireless communication sub-system 824. The USB interface 822 may be used to charge the UE 10 and may also enable the UE 10 to function as a peripheral device to exchange information with a personal computer or other computer system. The short range wireless communication sub-system 824 may include an infrared port, a Bluetooth interface, an IEEE 802.11 compliant wireless interface, or any other short range wireless communication sub-system, which may enable the UE 10 to communicate wirelessly with other nearby mobile devices and/or wireless base stations.

The input/output interface 818 may further connect the DSP 802 to the alert 826 that, when triggered, causes the UE 10 to provide a notice to the user, for example, by ringing, playing a melody, or vibrating. The alert 826 may serve as a mechanism for alerting the user to any of various events such as an incoming call, a new text message, and an appointment reminder by silently vibrating, or by playing a specific pre-assigned melody for a particular caller.

The keypad 828 couples to the DSP 802 via the interface 818 to provide one mechanism for the user to make selections, enter information, and otherwise provide input to the UE 10. The keyboard 828 may be a full or reduced alphanumeric keyboard such as QWERTY, Dvorak, AZERTY and sequential types, or a traditional numeric keypad with alphabet letters associated with a telephone keypad. The input keys may include a trackwheel, an exit or escape key, a trackball, and other navigational or functional keys, which may be inwardly depressed to provide further input function. Another input mechanism may be the LCD 830, which may include touch screen capability and also display text and/or graphics to the user. The LCD controller 832 couples the DSP 802 to the LCD 830.

The CCD camera 834, if equipped, enables the UE 10 to take digital pictures. The DSP 802 communicates with the CCD camera 834 via the camera controller 836. In another embodiment, a camera operating according to a technology other than Charge Coupled Device cameras may be employed. The GPS sensor 838 is coupled to the DSP 802 to decode global positioning system signals, thereby enabling the UE 10 to determine its position. Various other peripherals may also be included to provide additional functions, e.g., radio and television reception.

Figure 10:
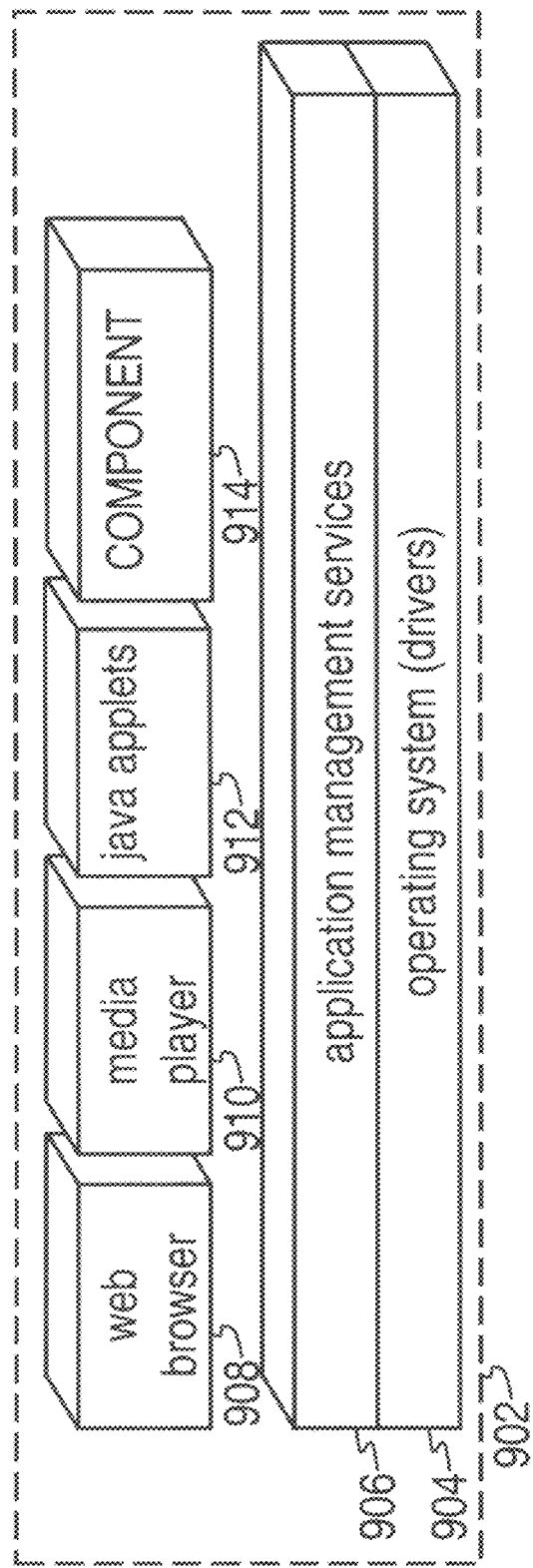
FIG. 10 is a diagram of a software environment that may be implemented on a UE operable for some of the various embodiments of the disclosure.

FIG. 10 illustrates a software environment 902 that may be implemented by the DSP 802. The DSP 802 executes operating system drivers 904 that provide a platform from which the rest of the software operates. The operating system drivers 904 provide drivers for the UE hardware with standardized interfaces that are accessible to application software. The operating system drivers 904 include application management services ("AMS") 906 that transfer control between applications running on the UE 10. Also shown in FIG. 10 are a web browser application 908, a media player application 910, and Java applets 912. The web browser application 908 configures the UE 10 to operate as a web browser, allowing a user to enter information into forms and select links to retrieve and view web pages. The media player application 910 configures the UE 10 to retrieve and play audio or audio-visual media. The Java applets 912 configure the UE 10 to provide games, utilities, and other functionality. A component 914 might provide functionality described herein.

Figure 11:
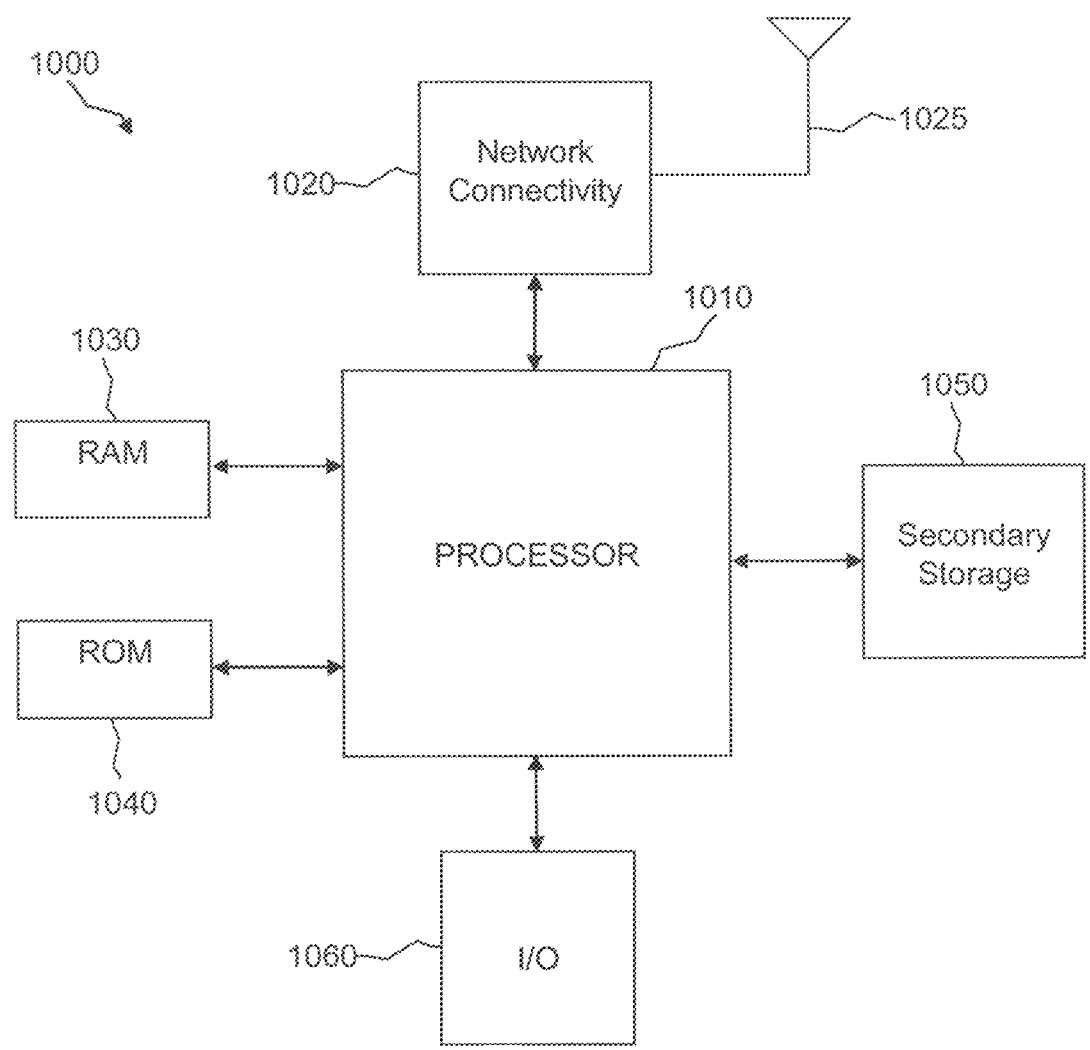
FIG. 11 is an illustrative general purpose computer system suitable for some of the various embodiments of the disclosure.

The UE 10, base station 120, and other components described above might include a processing component that is capable of executing instructions related to the actions described above. FIG. 11 illustrates an example of a system 1000 that includes a processing component 1010 suitable for implementing one or more embodiments disclosed herein. In addition to the processor 1010 (which may be referred to as a central processor unit (CPU or DSP), the system 1000 might include network connectivity devices 1020, random access memory (RAM) 1030, read only memory (ROM) 1040, secondary storage 1050, and input/output (I/O) devices 1060. In some cases, some of these components may not be present or may be combined in various combinations with one another or with other components not shown. These components might be located in a single physical entity or in more than one physical entity. Any actions described herein as being taken by the processor 1010 might be taken by the processor 1010 alone or by the processor 1010 in conjunction with one or more components shown or not shown in the drawing.

The processor 1010 executes instructions, codes, computer programs, or scripts that it might access from the network connectivity devices 1020, RAM 1030, ROM 1040, or secondary storage 1050 (which might include various disk-based systems such as hard disk, floppy disk, or optical disk). While only one processor 1010 is shown, multiple processors may be present. Thus, while instructions may be discussed as being executed by a processor, the instructions may be executed simultaneously, serially, or otherwise by one or multiple processors. The processor 1010 may be implemented as one or more CPU chips.

The network connectivity devices 1020 may take the form of modems, modem banks, Ethernet devices, universal serial bus (USB) interface devices, serial interfaces, token ring devices, fiber distributed data interface (FDDI) devices, wireless local area network (WLAN) devices, radio transceiver devices such as code division multiple access (CDMA) devices, global system for mobile communications (GSM) radio transceiver devices, worldwide interoperability for microwave access (WiMAX) devices, and/or other well-known devices for connecting to networks. These network connectivity devices 1020 may enable the processor 1010 to communicate with the Internet or one or more telecommunications networks or other networks from which the processor 1010 might receive information or to which the processor 1010 might output information.

The network connectivity devices 1020 might also include one or more transceiver components 1025 capable of transmitting and/or receiving data wirelessly in the form of electromagnetic waves, such as radio frequency signals or microwave frequency signals. Alternatively, the data may propagate in or on the surface of electrical conductors, in coaxial cables, in waveguides, in optical media such as optical fiber, or in other media. The transceiver component 1025 might include separate receiving and transmitting units or a single transceiver. Information transmitted or received by the transceiver 1025 may include data that has been processed by the processor 1010 or instructions that are to be executed by processor 1010. Such information may be received from and outputted to a network in the form, for example, of a computer data baseband signal or signal embedded in a carrier wave. The data may be ordered according to different sequences as may be desirable for either processing or generating the data or transmitting or receiving the data. The baseband signal, the signal embedded in the carrier wave, or other types of signals currently used or hereafter developed may be referred to as the transmission medium and may be generated according to several methods well known to one skilled in the art.

The RAM 1030 might be used to store volatile data and perhaps to store instructions that are executed by the processor 1010. The ROM 1040 is a non-volatile memory device that typically has a smaller memory capacity than the memory capacity of the secondary storage 1050. ROM 1040 might be used to store instructions and perhaps data that are read during execution of the instructions. Access to both RAM 1030 and ROM 1040 is typically faster than to secondary storage 1050. The secondary storage 1050 is typically comprised of one or more disk drives or tape drives and might be used for non-volatile storage of data or as an over-flow data storage device if RAM 1030 is not large enough to hold all working data. Secondary storage 1050 may be used to store programs that are loaded into RAM 1030 when such programs are selected for execution.

The I/O devices 1060 may include liquid crystal displays (LCDs), touch screen displays, keyboards, keypads, switches, dials, mice, track balls, voice recognizers, card readers, paper tape readers, printers, video monitors, or other well-known input/output devices. Also, the transceiver 1025 might be considered to be a component of the I/O devices 1060 instead of or in addition to being a component of the network connectivity devices 1020. Some or all of the I/O devices 1060 may be substantially similar to various components depicted in the previously described drawing of the UE 10, such as the display 702 and the input 704.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

Also, techniques, systems, subsystems and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component, whether electrically, mechanically, or otherwise. Other examples of changes, substitutions, and alterations are ascertainable by one skilled in the art and may be made without departing from the spirit and scope disclosed herein.

To apprise the public of the scope of this invention, the following claims are made:

The invention claimed is:

1. A method for providing transmit diversity in wireless network communications, including:
   receiving an indication of a slot structure, the slot structure identifying at least a first location of a reference signal within a slot;
   transmitting a first reference signal within a first slot using a first antenna, a location of the first reference signal within the first slot being determined by the slot structure; and
   transmitting a second reference signal within the first slot using a second antenna, a location of the second reference signal within the first slot being determined by the slot structure or being equal to the location of the first reference signal within the slot,
   wherein the slot structure identifies a second location of a reference signal within the slot structure, the second location being offset from the first location, and including transmitting a third reference signal within the first slot at the second location on the first antenna.

2. The method of claim 1, wherein the slot structure identifies a plurality of reference signal locations in the slot.

3. The method of claim 1, wherein the slot structure is one of a plurality of slot structures, at least two of the plurality of slot structures having distinct reference signal locations.

4. The method of claim 1, wherein receiving an indication of a slot structure includes receiving a cqi-pucch resource index.

5. The method of claim 1, including transmitting a plurality of reference signals in a second slot, the second slot having a slot structure with a different configuration from the first slot structure, the first and second slot being transmitted in a first subframe.

6. A method for providing transmit diversity in wireless network communications, including: receiving an indication of a slot structure, the slot structure identifying at least a location of a first reference signal and a location of a second reference signal;
transmitting a first and a second symbol within a first slot using a first antenna and a first orthogonal resource, the second symbol being transmitted after the first symbol;
transforming the first and second symbols to form a first transformed symbol and a second transformed symbol;
transmitting the transformed first symbol and the transformed second symbol within the first slot using a second antenna and the first orthogonal resource, the first transformed symbol being transmitted after the second transformed symbol;
transmitting a first reference signal within the first slot at a location determined by the slot structure, the first reference signal being transmitted using a first antenna; and
transmitting a second reference signal within the first slot at a second location determined by the slot structure, the second reference signal being transmitted using a second antenna.

7. The method of claim 6, including:
transmitting a third symbol within the first slot using the first antenna and the first orthogonal resource; and
transmitting the third symbol within the first slot using the second antenna and a second orthogonal resource.

8. The method of claim 6, wherein transforming the first and second symbols to form a first transformed symbol and a second transformed symbol includes at least one of negating at least one of the first and second symbol, complex conjugation of at least one of the first and second symbol, and leaving at least one of the first and second symbol unchanged.

9. The method of claim 6, wherein transforming the first and second symbols to form a first transformed symbol and a second transformed symbol includes:
using a first transformation to transform the first symbol; and
using a second transformation to transform the second symbol, the first transformation being different from the second transformation.

10. The method of claim 6, wherein receiving an indication of a slot structure includes receiving a cqi-pucch resource index.

11. A method for providing transmit diversity in wireless network communications, including:
receiving an indication of a Physical Uplink Control Channel (PUCCH) timing advance;
transmitting a first reference signal of a PUCCH at a delay relative to downlink frame timing at least partially determined by the PUCCH timing advance;
transmitting a second reference signal of a PUCCH at a delay relative to downlink frame timing at least partially determined by the PUCCH timing advance; and
transmitting a reference signal in a Physical Uplink Shared Channel (PUSCH) at a delay relative to downlink frame timing at least partially determined by a different timing advance than the PUCCH timing advance.

12. A base station, comprising:
a processor, the processor being configured to:
transmit an indication of a slot structure, the slot structure identifying at least a first location of a reference signal within a slot;
receive a first reference signal within a first slot, a location of the first reference signal within the first slot being determined by the slot structure; and
receive a second reference signal within the first slot, a location of the second reference signal within the first slot being determined by the slot structure or being equal to the location of the first reference signal within the slot,
wherein the slot structure identifies a second location of a reference signal within the slot structure, the second location being offset from the first location, and including transmitting a third reference signal within the first slot at the second location on the first antenna.

13. A user equipment (UE), comprising:
a processor, the processor being configured to:
receive an indication of a slot structure, the slot structure identifying at least a first location of a reference signal within a slot;
transmit a first reference signal within a first slot using a first antenna, a location of the first reference signal within the first slot being determined by the slot structure; and
transmit a second reference signal within the first slot using a second antenna, a location of the second reference signal within the first slot being determined by the slot structure or being equal to the location of the first reference signal within the slot;
wherein the slot structure identifies a second location of a reference signal within the slot structure, the second location being offset from the first location, and including transmitting a third reference signal within the first slot at the second location on the first antenna.

* * * * *